(12) United States Patent
Halbherr et al.

(10) Patent No.: US 8,856,671 B2
(45) Date of Patent: Oct. 7, 2014

(54) ROUTE SELECTION BY DRAG AND DROP

(75) Inventors: Michael Halbherr, Berlin (DE); Kalle Sakari Saarinen, Berlin (DE); Mirko Eichhorn, Berlin (DE); Daniel Knauth, Berlin (DE); Sven Koerbitz, Berlin (DE)

(73) Assignee: Navteq B.V., Veldhoven (NL)

( * ) Notice: Subject to any disclaimer, the term of this patent is extended or adjusted under 35 U.S.C. 154(b) by 919 days.

(21) Appl. No.: 12/118,726

(22) Filed: May 11, 2008

(65) Prior Publication Data

US 2009/0282353 A1 Nov. 12, 2009

(51) Int. Cl.
G06F 3/048 (2013.01)
G01C 21/36 (2006.01)
G06F 3/0486 (2013.01)

(52) U.S. Cl.
CPC .......... *G01C 21/3679* (2013.01); *G06F 3/0486* (2013.01)
USPC ...................................................... 715/769

(58) Field of Classification Search
USPC ................................................. 715/769, 855
See application file for complete search history.

(56) References Cited

U.S. PATENT DOCUMENTS

| | | | |
|---|---|---|---|
| 5,710,922 A * | 1/1998 | Alley et al. ........................ 1/1 |
| 6,075,530 A * | 6/2000 | Lucas et al. ................... 715/804 |
| 6,321,158 B1 * | 11/2001 | DeLorme et al. ............. 701/426 |
| 6,408,307 B1 * | 6/2002 | Semple et al. ................. 707/724 |
| 6,529,143 B2 * | 3/2003 | Mikkola et al. ............ 340/995.1 |
| 6,542,817 B2 * | 4/2003 | Miyaki ........................ 701/209 |
| 6,839,628 B1 * | 1/2005 | Tu ................................ 701/209 |
| 6,856,901 B2 * | 2/2005 | Han .............................. 701/211 |
| 7,076,505 B2 * | 7/2006 | Campbell ............................ 1/1 |
| 7,155,339 B2 * | 12/2006 | Tu ................................ 701/209 |
| 7,171,304 B2 * | 1/2007 | Wako ........................... 701/200 |
| 7,239,960 B2 * | 7/2007 | Yokota et al. ................ 701/202 |
| 7,272,489 B2 * | 9/2007 | Tu ................................ 701/200 |
| 7,353,109 B2 * | 4/2008 | Han .............................. 701/209 |
| 7,406,665 B2 * | 7/2008 | Yokota ........................ 715/826 |
| 7,487,112 B2 * | 2/2009 | Barnes, Jr. .................. 705/26.8 |
| 7,555,725 B2 * | 6/2009 | Abramson et al. ........... 715/781 |
| 7,920,965 B1 * | 4/2011 | Nesbitt et al. ................ 701/416 |
| 8,126,960 B2 * | 2/2012 | Obradovich et al. ......... 709/203 |
| 2002/0013815 A1 * | 1/2002 | Obradovich et al. ......... 709/204 |

(Continued)

OTHER PUBLICATIONS

ESRI Developer Network, "Developing applications using the Mobile SDK," May 16, 2007, http://web.archive.org/web/20070516105331/http://edndoc.esri.com/arcobjects/9.2/NET_Server_Doc/developer/Mobile/dev_mobile_apps.htm.*

(Continued)

*Primary Examiner* — Matt Kim
*Assistant Examiner* — Maryam Ipakchi
(74) *Attorney, Agent, or Firm* — Ditthavong & Steiner, P.C.

(57) ABSTRACT

The various embodiments of the present invention may be directed to a system for facilitating data processing in a visual manner. An application may include, inter alia, a basket component for visually representing the particular data items that a user desires to be processed by an application. The application may allow a user to initially search for data items that may be of interest (e.g., points-of-interest or POIs). A user may select POIs to obtain additional descriptive information regarding each data item. If the selected POI is to be included in processing, a user may drag the visual representation of the POI into the basket component. When the basket component contains all POIs desired for processing, the user may further instruct the application to formulate a result that is a composite of some or all of the POIs in the basket component.

40 Claims, 17 Drawing Sheets

(56) References Cited

U.S. PATENT DOCUMENTS

| | | | | |
|---|---|---|---|---|
| 2002/0177944 | A1* | 11/2002 | Ihara et al. | 701/208 |
| 2003/0036848 | A1* | 2/2003 | Sheha et al. | 701/209 |
| 2003/0045301 | A1* | 3/2003 | Wollrab | 455/456 |
| 2004/0054428 | A1* | 3/2004 | Sheha et al. | 700/56 |
| 2005/0250516 | A1* | 11/2005 | Shim | 455/456.1 |
| 2005/0251331 | A1* | 11/2005 | Kreft | 701/207 |
| 2006/0059049 | A1* | 3/2006 | Morris et al. | 705/26 |
| 2006/0229807 | A1* | 10/2006 | Sheha et al. | 701/209 |
| 2007/0073562 | A1* | 3/2007 | Brice et al. | 705/5 |
| 2007/0078729 | A1* | 4/2007 | Brown | 705/26 |
| 2007/0208492 | A1* | 9/2007 | Downs et al. | 701/117 |
| 2007/0220174 | A1* | 9/2007 | Abhyanker | 709/250 |
| 2007/0288161 | A1* | 12/2007 | Neef et al. | 701/208 |
| 2008/0007399 | A1* | 1/2008 | Hart | 340/539.13 |
| 2008/0027632 | A1* | 1/2008 | Mauderer | 701/208 |
| 2008/0033635 | A1* | 2/2008 | Obradovich et al. | 701/201 |
| 2008/0052372 | A1* | 2/2008 | Weber et al. | 709/217 |
| 2008/0076451 | A1* | 3/2008 | Sheha et al. | 455/456.3 |
| 2008/0268876 | A1* | 10/2008 | Gelfand et al. | 455/457 |
| 2008/0307512 | A1* | 12/2008 | Tandon | 726/4 |
| 2009/0100363 | A1* | 4/2009 | Pegg et al. | 715/765 |
| 2009/0171576 | A1* | 7/2009 | Kim et al. | 701/209 |
| 2009/0177384 | A1* | 7/2009 | Walder | 701/208 |
| 2009/0216633 | A1* | 8/2009 | Whitsett et al. | 705/14 |
| 2010/0131189 | A1* | 5/2010 | Geelen et al. | 701/201 |

OTHER PUBLICATIONS

Mahmoud, "Getting Started with Data Synchronization Using SyncML," Sep. 2004, http://developers.sun.com/mobility/midp/articles/syncml/.*

Ryan, "Google Maps on Your Smartphone or Handheld," Aug. 12, 2005, http://www.palminfocenter.com/view_story.asp?ID=8021.*

International Search Report and Written Opinion, PCT/FI2009/050380, Aug. 4, 2009, pp. 1-13.

* cited by examiner

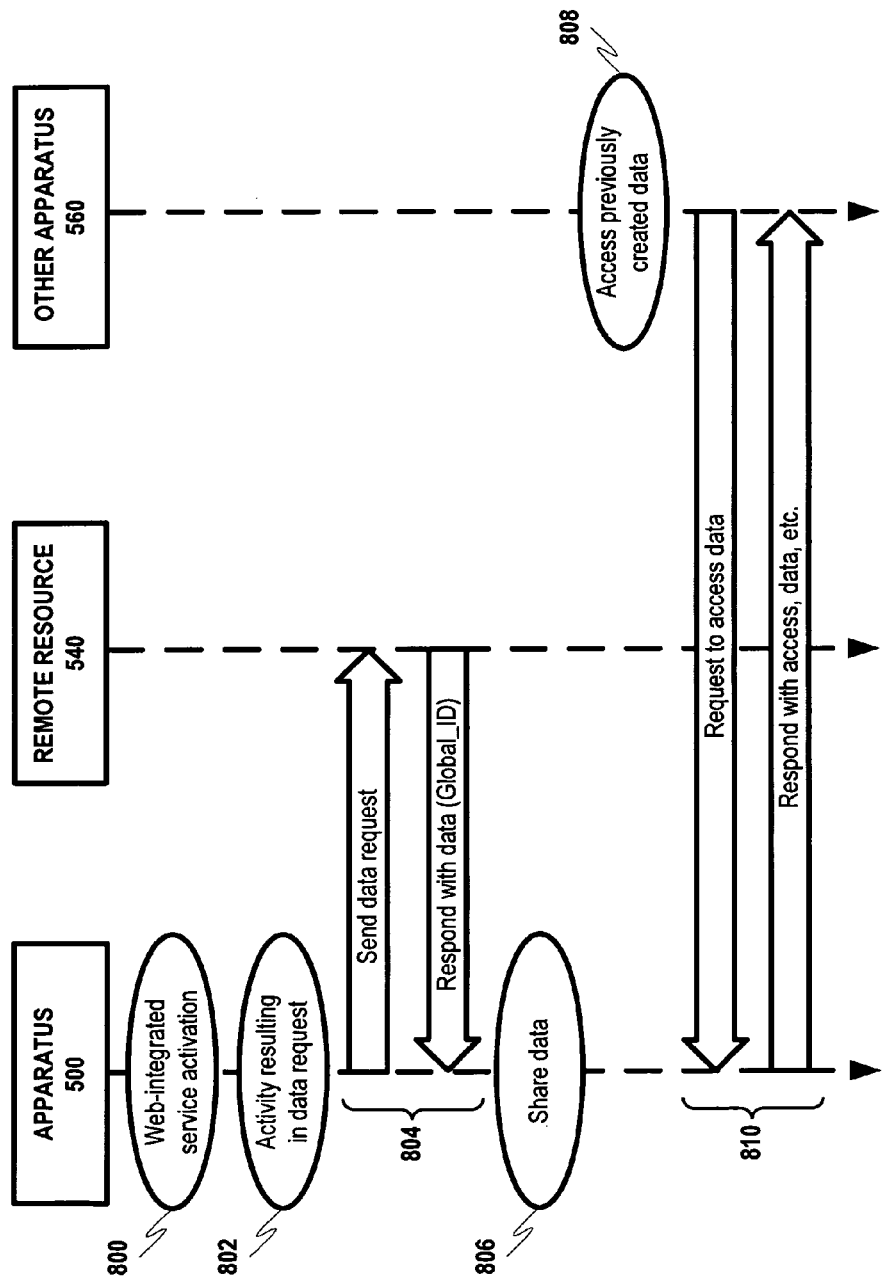

ROUTE SELECTION BY DRAG AND DROP

BACKGROUND

1. Field of Invention

Various embodiments of the present invention relate to the visual facilitation of data selection, and more specifically, to a system for formulating a composite result by visually dragging and dropping elements of the composite result into a visual representation of a basket.

2. Background:

Modern society has adopted, and is becoming reliant upon, devices for wireless communication. For example, cellular telephones continue to proliferate in the global marketplace due to technological improvements in both communication quality and device functionality. These wireless communication devices (WCDs) have become common for both personal and business use, allowing users to transmit and receive voice, text and graphical data from a multitude of geographic locations. The communication networks utilized by these devices span different frequencies and cover different transmission distances, each having specific features desirable for various applications.

The desire for users to employ wireless apparatuses in many different settings continues to keep pace with new communication enhancements incorporated in these devices. Additional functionality such as, for example, messaging clients (email, instant messenger, etc.), business applications (document readers, scheduling programs, interfaces to inventory management systems, etc.), location systems (GPS, mapping, navigation, etc.), multimedia and entertainment applications, as well as many more. These various applications may retrieve information via wired or wireless communication that, in view of a user configuration, may be required in order to perform the requested activity. The information needed during application execution may come from, for example, a remote source accessible via wireless communication.

While the above functionality is desirable, the configuration required in order to achieve a desired result may be prohibitive. In at least one scenario, a user of limited technical ability may be able generally to operate an apparatus, but may not possess the skills required to configure higher level applications. For example, the advent of various location-related features on modern wireless devices allow users not only to pinpoint their current location, but also to find other destinations via visual mapping, voice actuated direction-finding, etc. However, the configuration required to use such applications may require the entry of a substantial amount of information. If this configuration requires, for example, a large amount of menu navigation, text entry and parameter configuration, a user may deem the application too burdensome, technical, time consuming, etc. This problem may be made worse in situations where the apparatus may only include an extremely limited user interface (e.g., in some rudimentary wireless handheld devices). As a result, users may not take full advantage of the various features now available in multifunction devices because they do not feel that the burden of comprehending and then executing the required configuration justifies the benefits bestowed by the application.

SUMMARY

Various embodiments of the present invention are directed to at least a method, system, apparatus, chipset, interface architecture and computer program for facilitating data processing in a visual manner. An application may comprise, inter alia, a user interface for configuring functionality within the application, the user interface including at least a basket component for visually representing the particular data items that a user desires the application to process. The application may initially allow a user to locate data items that may be of interest to the user (e.g., points-of-interest or POIs). The user may then select each POI to obtain additional descriptive information about the POI. If the selected POI is to be included in processing, a user may then drag the visual representation of the POI into the basket component. When the basket component contains all POIs desired for processing, the user may instruct the application to formulate a result that is a composite of the POI information contained in the basket component.

In accordance with at least one exemplary embodiment of the present invention, a user may configure and execute a search or query in the application in order to compile one or more POIs. These POIs may be, for example, a subset of the total POIs available as defined by user-configured parameters. Upon selection, for example in response to positioning a computer cursor over a POI, the user may be presented with additional descriptive information concerning the POI. The user may repeat this procedure with some or all of the POIs in order to determine the particular data items that should be included for processing in the resulting composite data.

A user may then choose one or more desired POIs for inclusion in processing, for example, by dragging them into the basket component. After all of the desired data items have been placed in the basket, the user may instruct the application to formulate a composite result, based on the contents of the basket component, that may then be displayed to the user and/or stored for later use, forwarded to other users (e.g., along with the selected POI data), etc. An exemplary later use may involve configuring information to be shared with other users. In at least one scenario, users may configure and formulate a composite result using a web interface on a laptop/desktop computer in order to take advantage of better user interfaces and resources (e.g., processing, speed, power, etc.). The selected POI information and/or the composite result data may then be conveyed (e.g., shared) to a portable device for easy transport, availability, etc. Sharing may further be conducted on a larger scale, for example, via the use of a remote resource accessible by various wired and/or wireless apparatuses. Apparatuses may, in accordance with various embodiments of the present invention, store the contents of the basket component (e.g., as a data collection) and/or composite results on the remote resource, and may further search for, request access to or transmission of, etc. data that was previously stored on the remote resource.

DESCRIPTION OF DRAWINGS

The invention will be further understood from the following detailed description of various exemplary embodiments, taken in conjunction with the appended drawings.

FIG. 8B discloses a timeline diagram of an exemplary interaction between a wireless apparatus, a remote resource and another apparatus in accordance with at least one embodiment of the present invention.

DESCRIPTION OF EXEMPLARY EMBODIMENTS

While the present invention has been described in a variety of exemplary embodiments, various changes can be made therein without departing from the spirit and scope of the invention, as described in the appended claims.

I. Wireless Communication Over Different Communication Networks

Figure 1:
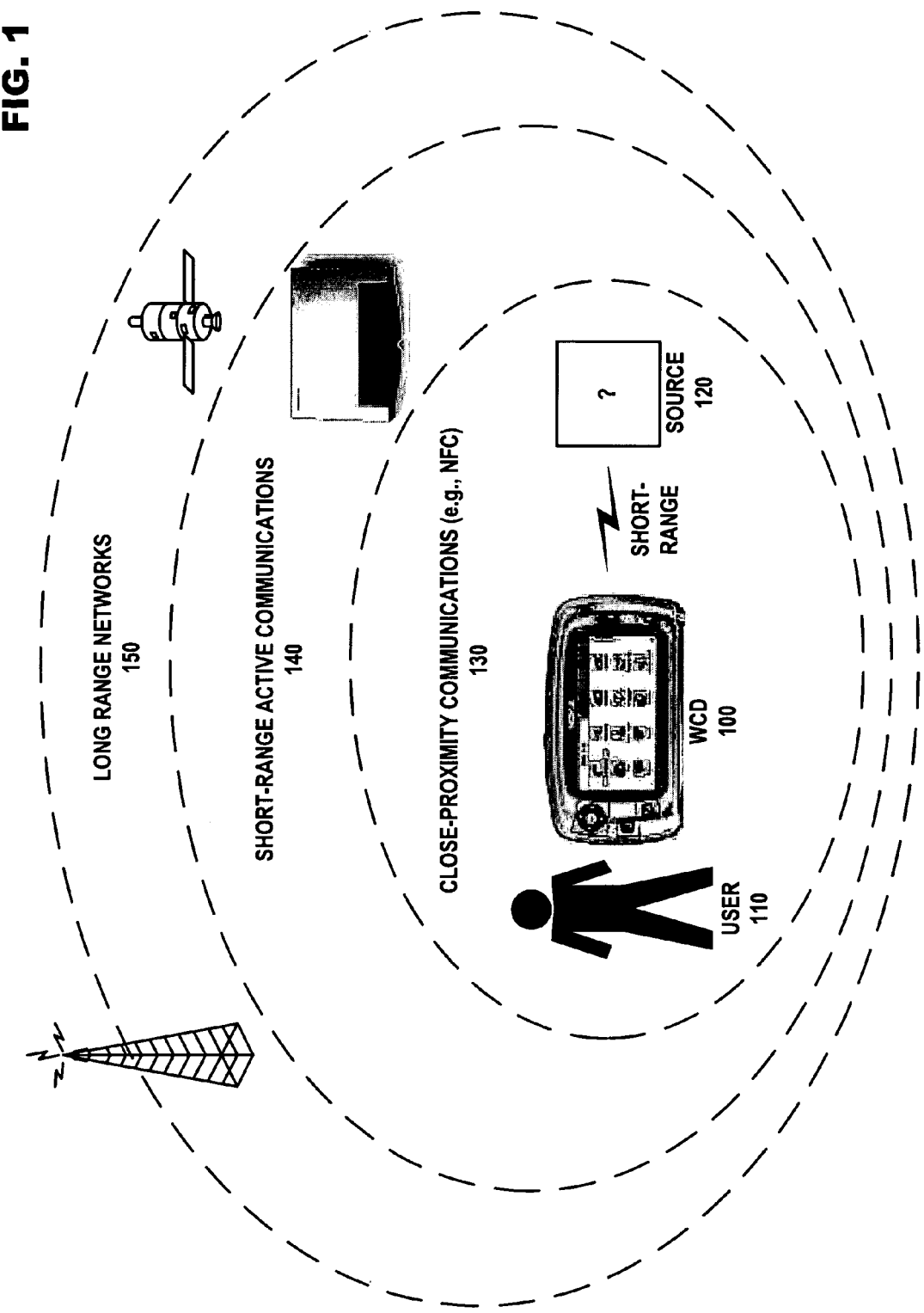
FIG. 1 discloses an exemplary wireless operational environment, including wireless communication mediums of different effective range.

Wireless communication devices (WCD) may transmit and receive information over a wide array of communication networks, each with different advantages regarding speed, range, quality (error correction), security (encoding), etc. These characteristics may determine the amount of information that can be transferred to a receiving device and the duration of time for this information transfer. FIG. 1 includes a diagram of an exemplary WCD and how it may interact with various types of wireless technologies.

In the example pictured in FIG. 1, user 110 possesses WCD 100. This device may be anything from a basic cellular handset to a more complex device such as a wirelessly enabled palmtop or laptop computer. Close-proximity communications 130 may include various transponder-type interactions wherein normally only the scanning device requires its own power source. WCD 100 scans source 120 via short-range communication. A transponder in source 120 may utilize the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, various embodiments of the present invention may be implemented utilizing a multitude of wired and/or wireless communication technology. Therefore, it is important to understand the communication tools available to user 110 before exploring these exemplary embodiments. For example, in the case of a cellular telephone or other handheld wireless devices, the integrated data handling capabilities of the device play an important role in facilitating transactions between the transmitting and receiving devices.

Figure 2:
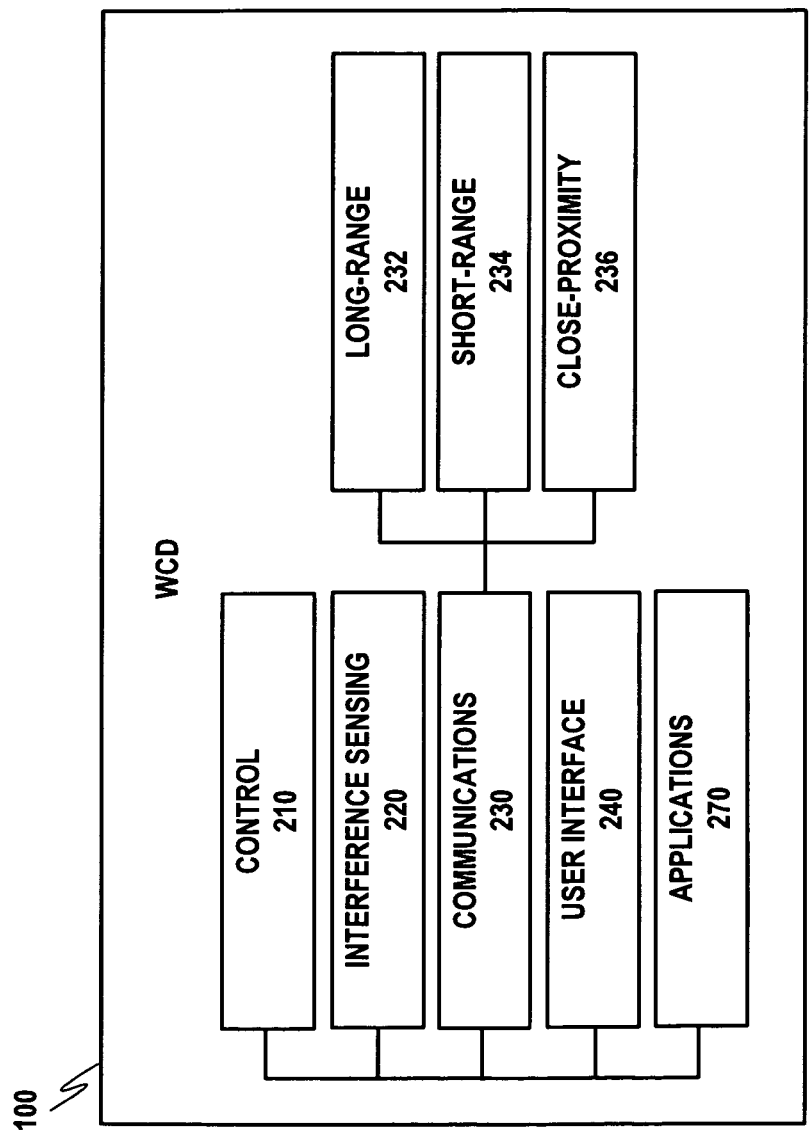
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by various combinations of the software and/or hardware components discussed below.

Control module 210 may regulate operation of the device. Inputs may be received from various other modules included within WCD 100. For example, interference sensing module 220 may use various techniques known in the art to sense sources of environmental interference within the effective transmission range of the wireless communication device. Control module 210 may interpret these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and close-proximity communications module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 270 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
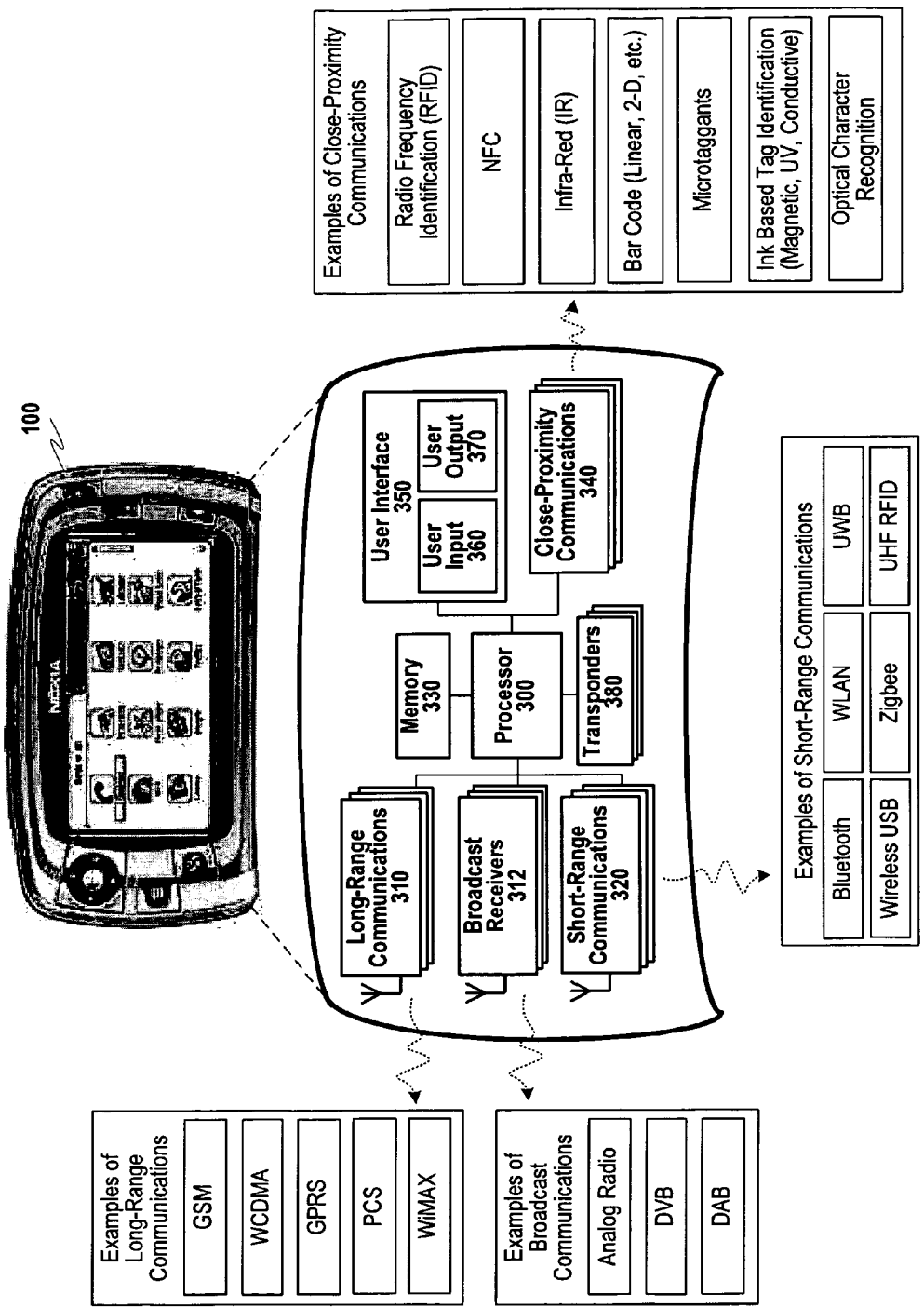
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications section 310 performs functions related to the exchange of information over large geographic areas (such as cellular networks) via an antenna. These communication methods include technologies from the previously described 1 G to 3 G. In addition to basic voice communication (e.g., via GSM), long-range communications section 310 may operate to establish data communication sessions, such as General Packet Radio Service (GPRS) sessions and/or Universal Mobile Telecommunications System (UMTS) sessions. Also, long-range communications section 310 may operate to transmit and receive messages, such as short messaging service (SMS) messages and/or multimedia messaging service (MMS) messages. Various IP protocols may also be included in the long-range communication network category.

As a subset of long-range communications section 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications section 320 is responsible for functions involving the exchange of information across short-range wireless networks. As described above and depicted in FIG. 3, examples of such short-range communications section 320 are not limited to Bluetooth.™, WLAN, UWB and Wireless USB connections. Accordingly, short-range communications section 320 performs functions related to the establishment of short-range connections, as well as processing related to the transmission and reception of information via such connections.

Close-proximity communications section 340, also depicted in FIG. 3, may provide functionality related to the short-range scanning of machine-readable data. For example, processor 300 may control components in close-proximity communications section 340 to generate RF signals for activating an RFID transponder, and may in turn control the reception of signals from an RFID transponder. Other examples of technologies for scanning machine-readable data that may be implemented in close-proximity communications section 340 may include RFID functionality corresponding to Near field communication (NFC), IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for close-proximity communications section 340 to scan various types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, at least one RFID scanner (or in a more specific scenario, at least one RFID scanner that may be configurable to communicate utilizing NFC) may be mounted in an entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique may link separate hardware components corresponding to processor 300, communications sections 310, 312, 320 and 340, memory 330, user interface 350, transponder 380, etc. together via one or more wired or wireless bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications section 310 and/or short-range communications section 320. The communication utilities component may include various routines that allow the reception of services from remote devices according to mediums such as the Wireless Application Medium (WAP), Hypertext Markup Language (HTML) variants like Compact HTML (CHTML), etc.

Figure 4:
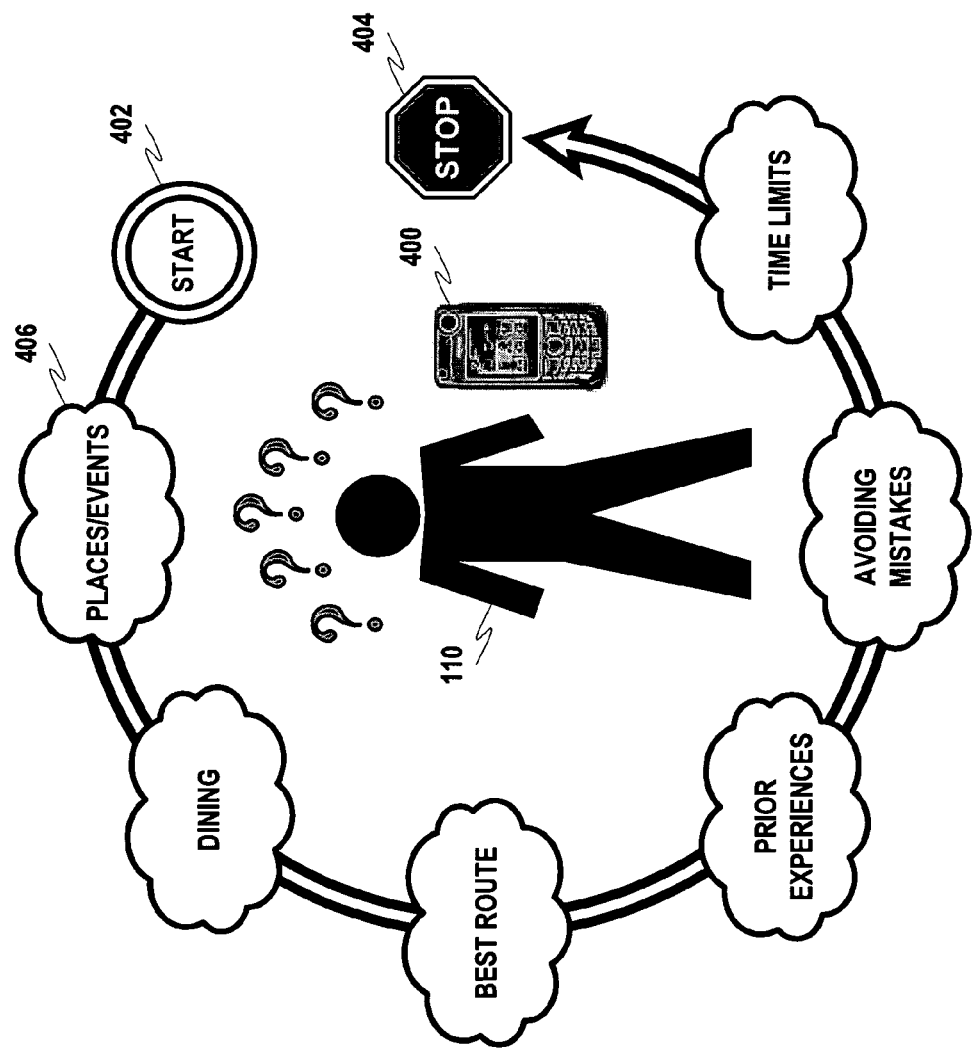
FIG. 4 discloses a problem scenario example set forth for the sake of explaining the various exemplary embodiments of the present invention.

An exemplary scenario is shown in FIG. 4 that will further be utilized to explain various embodiments of the present invention. Implementation of the present invention is not strictly limited to the various embodiments disclosed herein, and may be established using a multitude of configurations. In particular, various embodiments of the present invention may be implemented with various wireless-enabled apparatuses communicating using different wireless communication mediums. Disclosed devices and/or mediums are for explanation purposes only.

FIG. 4 discloses a confusing scenario being experienced by user 110. User 110 is attempting to plan travel, but is being overwhelmed by the number of contingencies involved in planning this trip. As shown in FIG. 4, the entire trip may begin at start 402 and end at stop 404. However, during the course of travel, various aspects 406 of the trip must be accounted for. User 110 would like to visit a number of places/events, which in this example may include landmarks, historical areas, museums, festivals, fairs, etc. During visits to these places/events, user 110 wants to know the worthwhile dining establishments, for example, based on other users' reviews. Like most travelers, user 110 wants to know the best route between destinations, as well as the routes to avoid, based for example on the comments of other travelers. Finally, as is the case with most travelers, user 110 has a limited time period in order to account for the above criteria.

Figure 5:
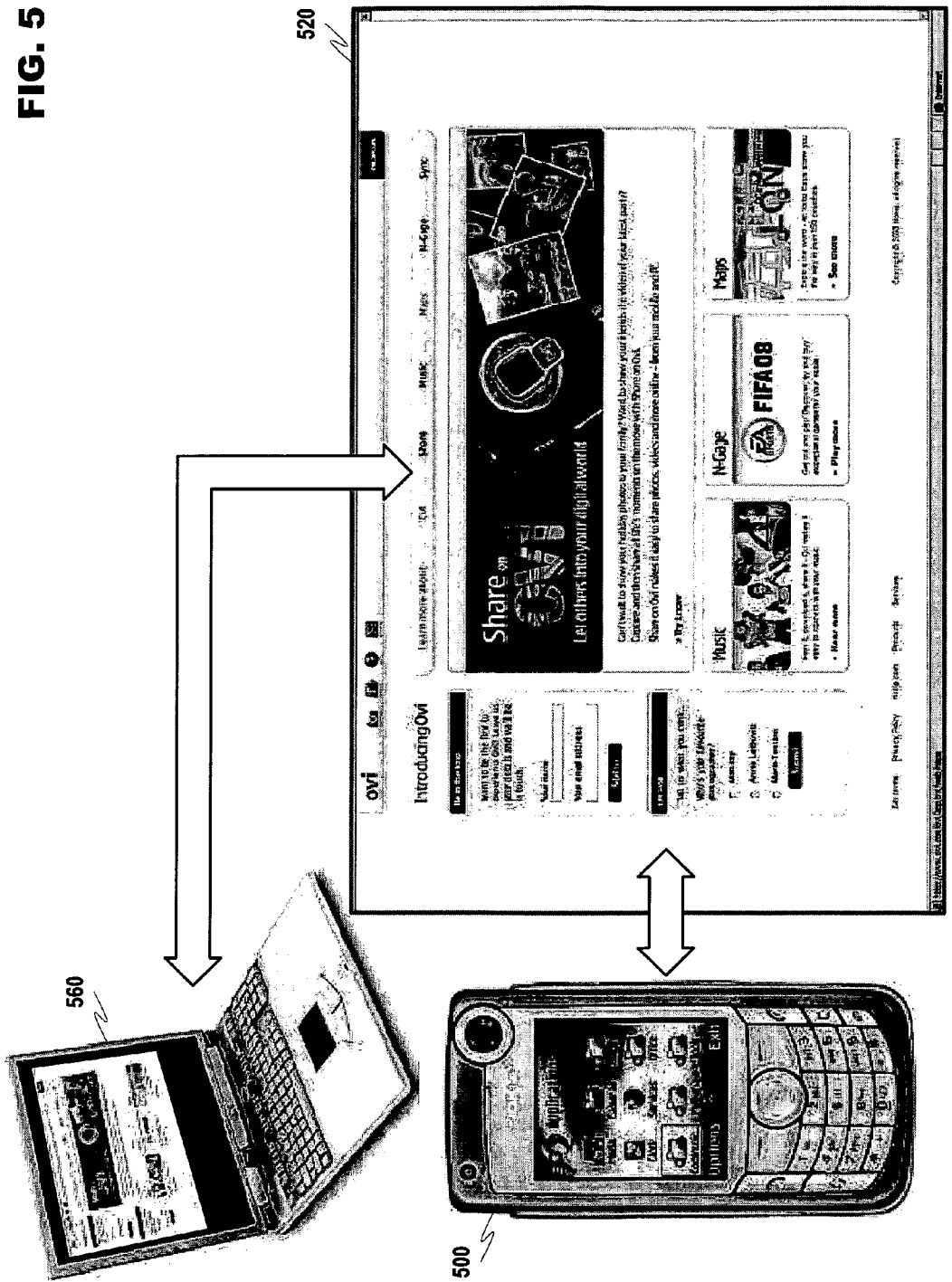
FIG. 5 discloses an exemplary interaction between various apparatuses and a remote resource in accordance with at least one embodiment of the present invention.

Various embodiments of the present invention may include at least a system for formulating composite information based on various data items. The elements of the system such as applications, data items (also identified herein as points-of-interest) may reside on one or more apparatuses coupled via wired and/or wireless communication. An exemplary apparatus arrangement usable in accordance with at least one embodiment of the present invention is disclosed in FIG. 5. Exemplary wireless apparatus 500, may include any and/or all of the modules, components, functionality, etc. described with respect to exemplary WCD 100. Wireless apparatus 500 may participate in various interactions with remote resource 520. Remote resource 520 in this example may include one or more networked computing resources (e.g., computers, file servers, routers, modems, etc.) having an Internet webpage interface that is accessible via a wired or wireless link. These access methods may include, for example, a long-range wireless data connection (e.g., cellular communication) which may be established directly with a service provider in order to access the Internet, a short-range connection established to an access point using a medium like Bluetooth.™, WLAN, etc., a wired link via Ethernet, Firewire, etc.

Other apparatuses may also access remote resource 520 via the aforementioned examples of wired and/or wireless connection. For example, a computing device (e.g., a laptop computer) 560 is shown accessing remote resource 520 via a web browser. The web browser is configurable to display the Internet webpage interface of remote resource 520 so that a user of apparatus 560 can interact with various resources residing in remote resource 520. Both wireless apparatus 500 and other apparatus 560 may send information to, as well as receive information from remote resource 520. In this example, a website www.ovi.com has been used to represent remote resource 520. This website, created and supported by Nokia Corporation, is a central repository via which users can share information (pictures, multimedia, etc.) or obtain information (e.g., maps, music, games, etc.) that may be stored or formulated according to user configuration. While this particular website has been used for the sake of example in explaining the various embodiments of the present invention, the invention is not specifically limited to the disclosed implementation.

IV. Exemplary Resources for Supporting Information Sharing.

Figure 6:
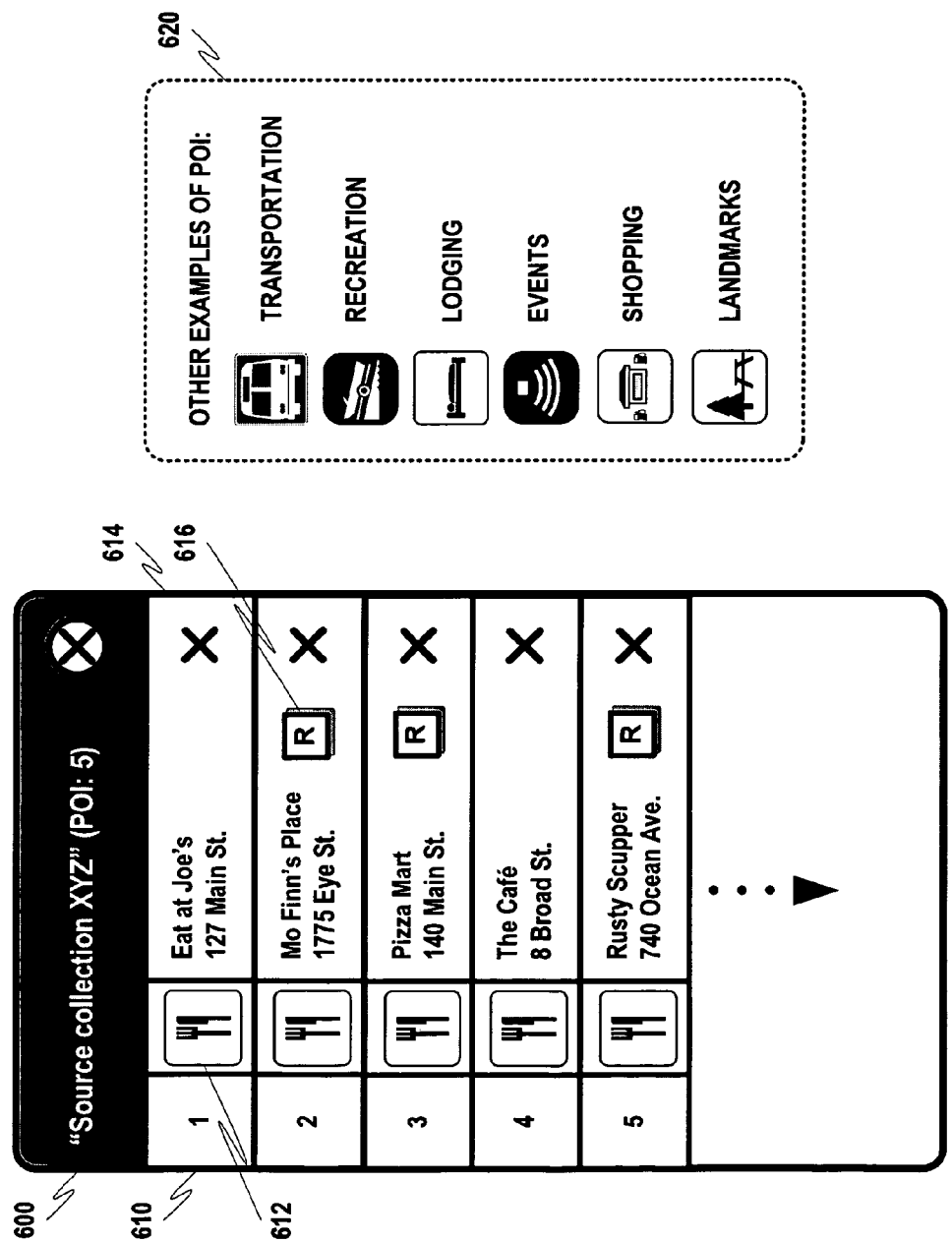
FIG. 6 discloses an exemplary source collection including a plurality of POIs in accordance with at least one embodiment of the present invention.

FIG. 6 discloses an exemplary collection of points-of-interest usable with various embodiments of the present invention. Source collection 600 may be the result of, for example, a query defined by a user in a map and/or route creation application residing on an apparatus or available via the Internet. For example, an application may utilize information defined by user interaction (e.g., via an application user interface) to formulate results that may be composed of some or all of the user-defined information. In this example, composite results may include terrain or transportation-related maps (e.g., driving, train, etc.), routes, directions, etc. However, map and/or route creation is only one use to which various embodiments of the present invention may be applied, and therefore, this exemplary use is not intended to limit the present invention.

Initially, source collection 600 may be named in accordance with the process that created it. In this example the source collection has been assigned the generic name "XYZ." Further, the title bar of source collection 600 may also include additional information, such as the number of POIs 610 returned from the process that created source collection 600. In the particular example disclosed herein, user 110 may define a geographic area, a type of food, an estimated meal cost, a rating level, etc. that results in the POIs 610 in source collection 600. POI 610 may include, for example, an ordinal value, a symbol 612 identifying the type of POI. The ordinal value for POI 610 may, for example, indicate the level of relevance the data item has with regard to the query parameters configured by user 110 in order to create source collection 600. In source collection 600, all POIs 610 have a symbol 612 indicating that they are dining establishments. However, the various embodiments of the present invention are not limited only to this type of POI. More specifically, examples of other POIs that may be queried according to the present example are shown in table 620. A user may also create "custom" POIs by inputting data like name, location, address, type, description, etc. into a template. In various embodiments of the present invention, a simple form of source collection may comprise a user-viewable map format. With this configuration POIs may be displayed on the map for a user to select and drag to the basket. Further, it may be possible to activate different kinds of POI "layers" for display which may present different POI categories, like restaurants, transportation, shopping, etc.

POI 610 may also include identification and location information 614 comprising data such as the name of the POI, the address, directions, contact information such as telephone numbers, email, website information, etc. It is important to note that not all of identification and location information 614 may be readily available to a user. For example, some location-related data (e.g., longitude/latitude coordinates, cell IDs, etc.) may exist within the POI data structure but would not be visible during normal user interaction. Identification and location information 614 may further be accompanied by one or more signals 616. These signals may indicate, for example, that additional information is available in relation to the particular POI 610. In the disclosed example, "R" may indicate that user review information is available for the particular POI 610. In addition, both the source collection 600 and each POI 610 may include one or more controls typically associated with a window-based software architecture. For example, a close control "X" for removing a POI 610 or for closing the entire source collection 600.

V. Source Collection Basket Interaction.

Figure 7A:
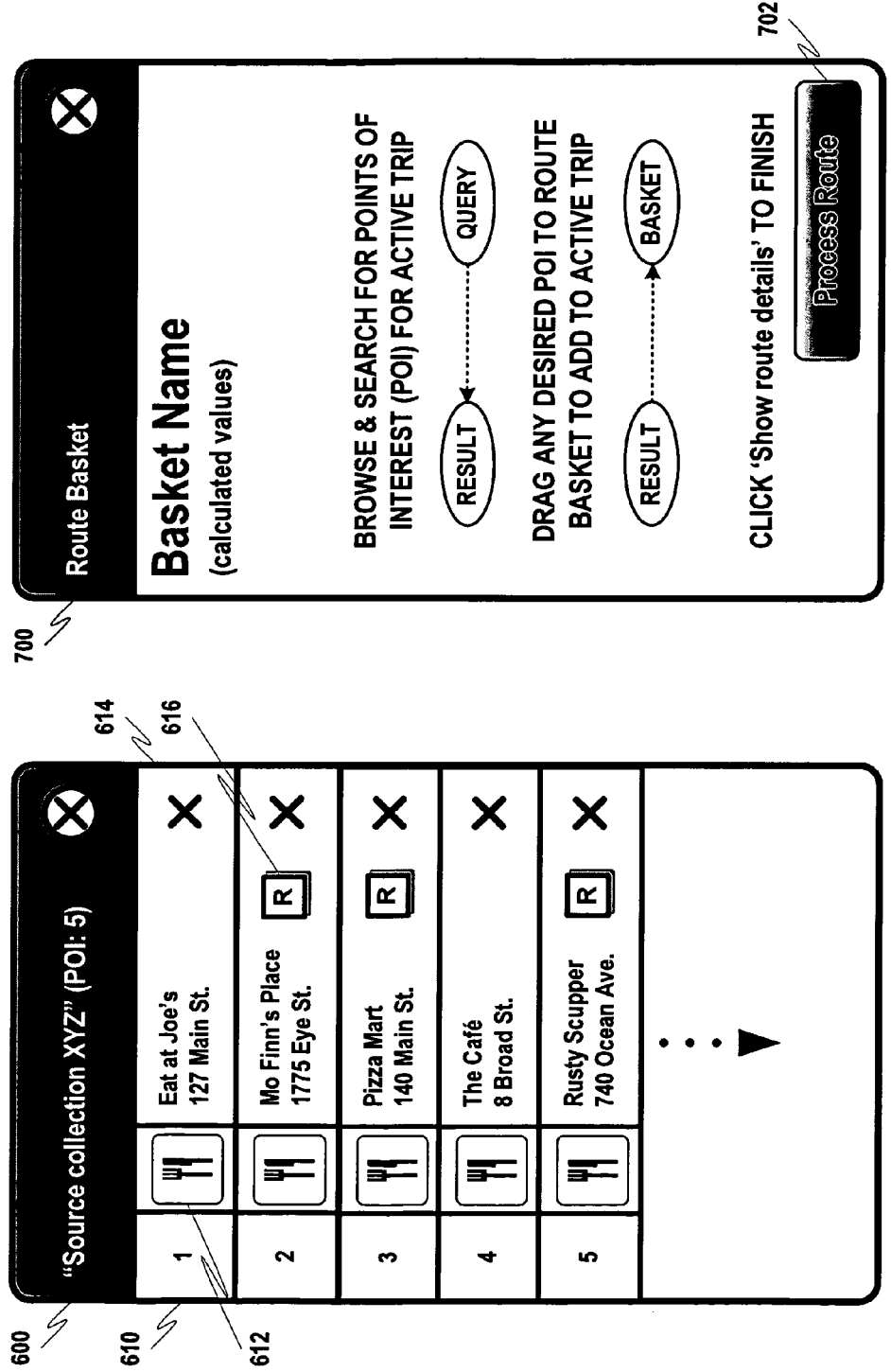
FIG. 7A discloses an exemplary source collection and basket component in accordance with at least one embodiment of the present invention.
Figure 7B:
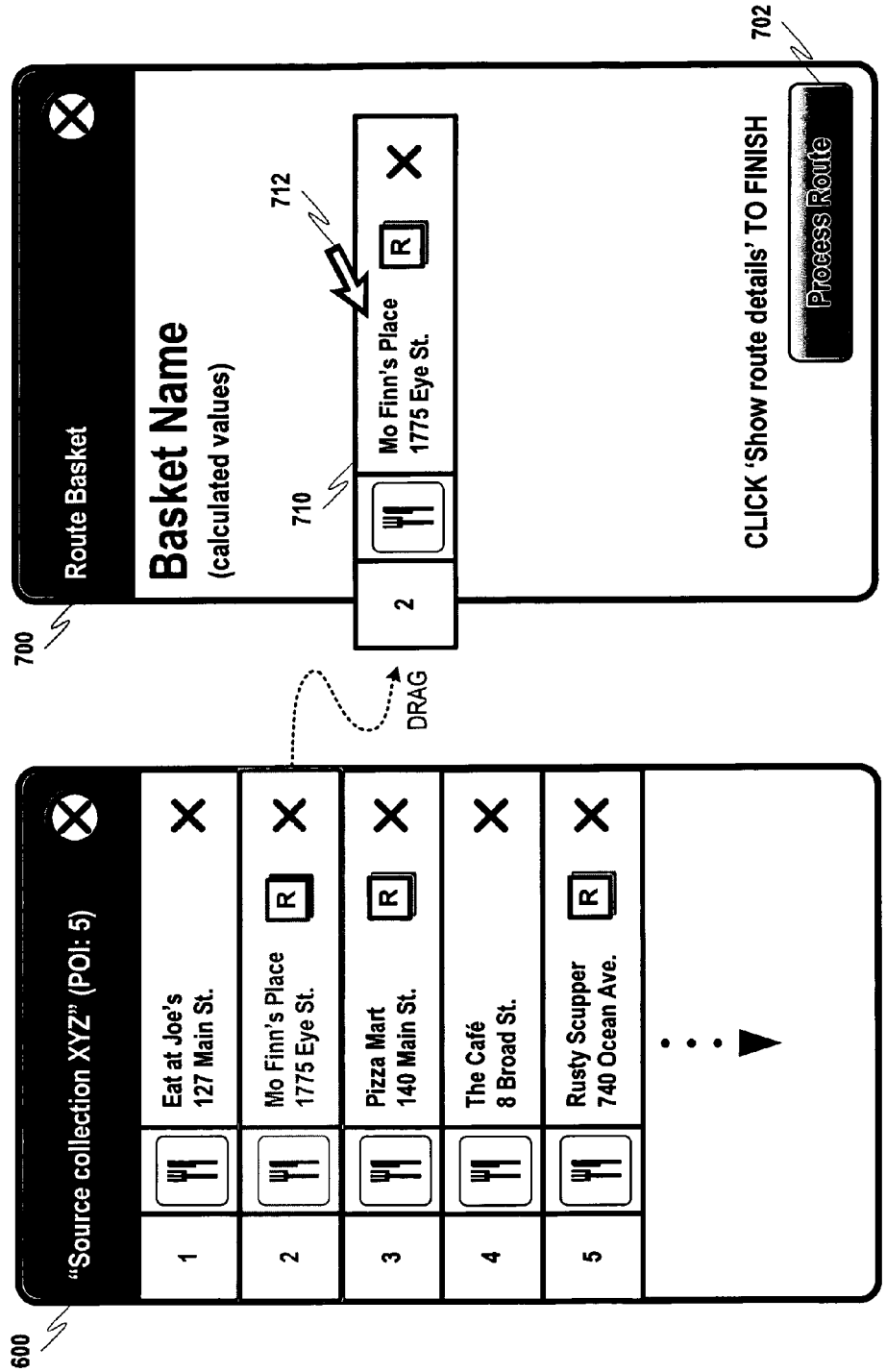
FIG. 7B discloses an exemplary drag operation in accordance with at least one embodiment of the present invention.
Figure 7C:
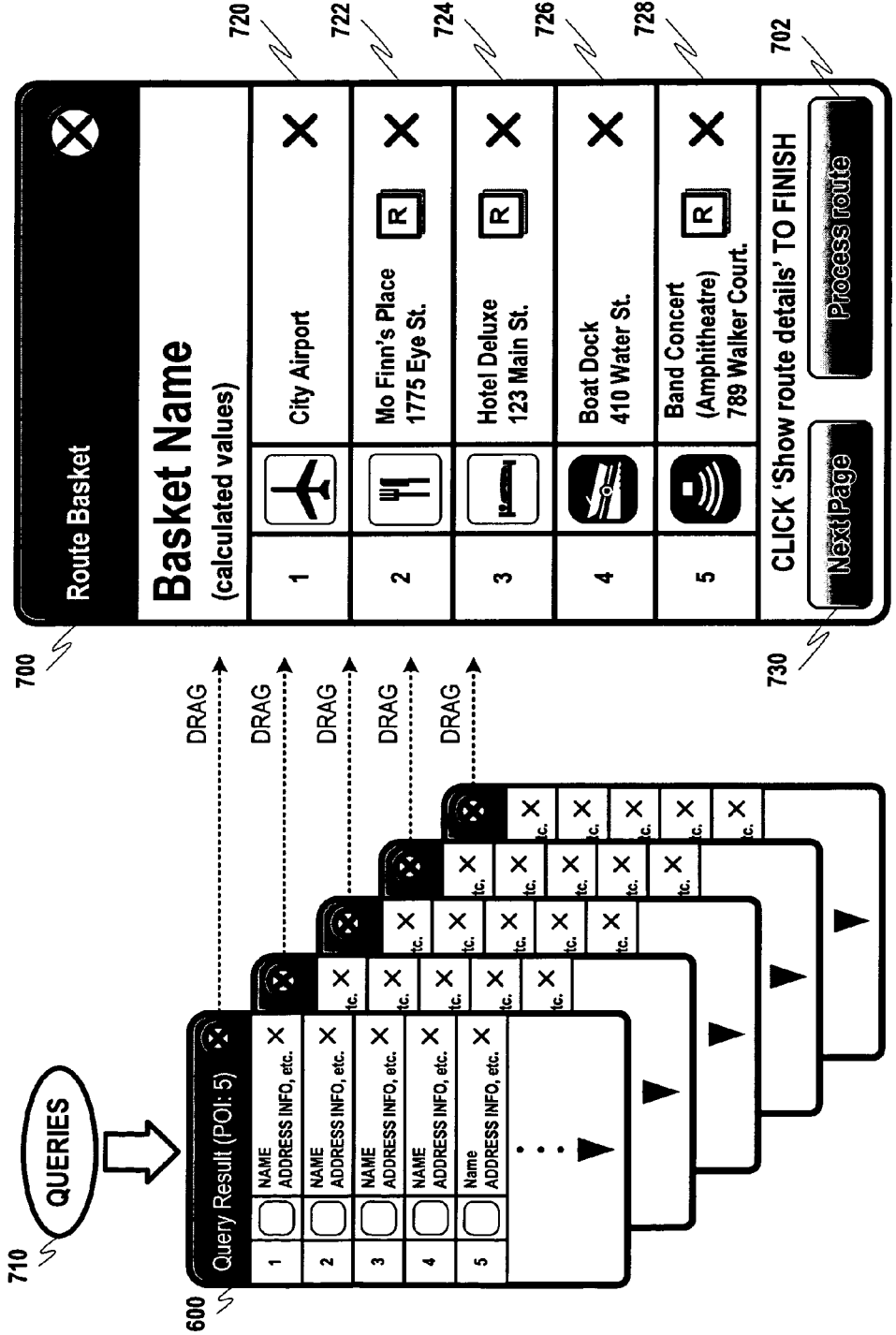
FIG. 7C discloses an exemplary route basket including a plurality of POIs in accordance with at least one embodiment of the present invention.

FIG. 7A-7C disclose an interaction example between source collection 600 and a basket component 700. In accordance with the example being utilized for explanation herein, basket component 700 shown in FIG. 7A is a route basket for accumulating travel-related data items. As described within route basket 700, a user may browse and search for POIs 610 for the active trip, and then drag any results of interest into route basket 700. Once all desired POIs 610 have been added to route basket 700, the "process route" button 702 may be clicked, triggering the travel application to formulate a composite result including all of the POIs 610.

Now referring to FIG. 7B, an example of "dragging" a data item from source collection 600 is disclosed. Dragged POI 710 may be moved from source collection 600 to route basket 700 using a typical click, hold, drag and release action as generally known in the art of computer input devices. In at least one embodiment of the present invention, simply moving cursor 712 over a POI 610 may cause descriptive information to be displayed to user 110. For example, moving the cursor over (e.g., "mouse-over") POI 610 may trigger a pop-up box to become visible including a brief summary of available descriptive information pertaining to the data item. In at least one exemplary configuration, only part of the descriptive information may be selectable, and this selectable part may be available for drag-and-drop, or would be desirable to drag-and-drop. Further, selecting (e.g., "clicking on") POI 610 may display the entire body of information previously summarized with respect to the exemplary "mouse-over" operation.

FIG. 7C takes the exemplary interaction of FIG. 7B further by showing an example of a fully complete route basket 700. In the particular scenario disclosed, queries 710 may yield a number of difference source collections 600 (e.g., query results). Items from each of these queries may be utilized to build a complete assortment of data, which may be processed into a composite output, include at least some elements of all POIs 720-728. In this example, user 710 has defined a travel itinerary. User 110 may initiate travel with an airplane flight, which is why the first POI 702 is the arrival airport. After user 110 lands in the area of travel, a meal represented by dining POI 722 may be followed by a trip to a hotel at POI 724 (e.g., to drop off luggage). User 110 may then plan tourist activities including, for example, visiting a boat dock at POI 726, followed by a band concert at an amphitheatre represented by POI 728. In at least one configuration, if the number of POIs 610 exceeds the display size of route basket 700, then user 110 may click the "Next Page" button 730 in order to continue adding POIs 610 to route basket 700. Once all desired data items have been added to route basket 700, processing of the POIs 610 in route basket 700 may be triggered by pushing "Process Route" button 702. In accordance with at least one embodiment, certain configurations of the present invention may only allow one route basket to be modified at a time. However, users may create and store several alternative POI collections based on, for example, the time available for completing the route.

Figure 7D:
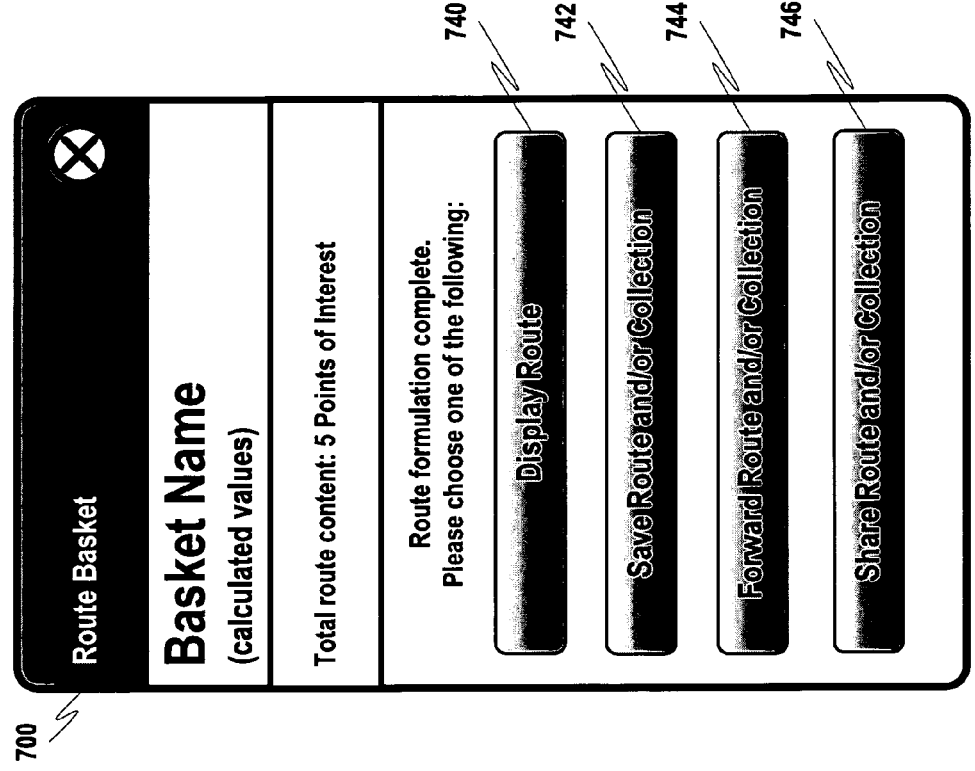
FIG. 7D discloses exemplary completed route basket processing options in accordance with at least one embodiment of the present invention.

Initiating route processing may, in accordance with at least one embodiment of the present invention, prompt a choice of preferred output processing. FIG. 7D discloses an exemplary display of output processing options. For example, a user may simply display the resulting composite output (e.g., the route) by clicking on 740. However, if a user wants to save the formulated route information and/or the contents of route basket 700 (e.g., as a collection), then clicking on 742 may offer options for configuring saving functionality. Alternatively, users may want to provide some or all of this information to other users. In situations where, for example, the other users to receive the information are specific, clicking on 744 may provide options for entering address information for transmitting route and/or collection information via email, SMS, etc. Route and/or collection information may also be configured for "sharing" by clicking 746 so that other users (e.g., registered with a remote resource) may also access the information. An exemplary sharing architecture and configuration are described further below.

VI. Sharing Information with Other Users.

Figure 8A:
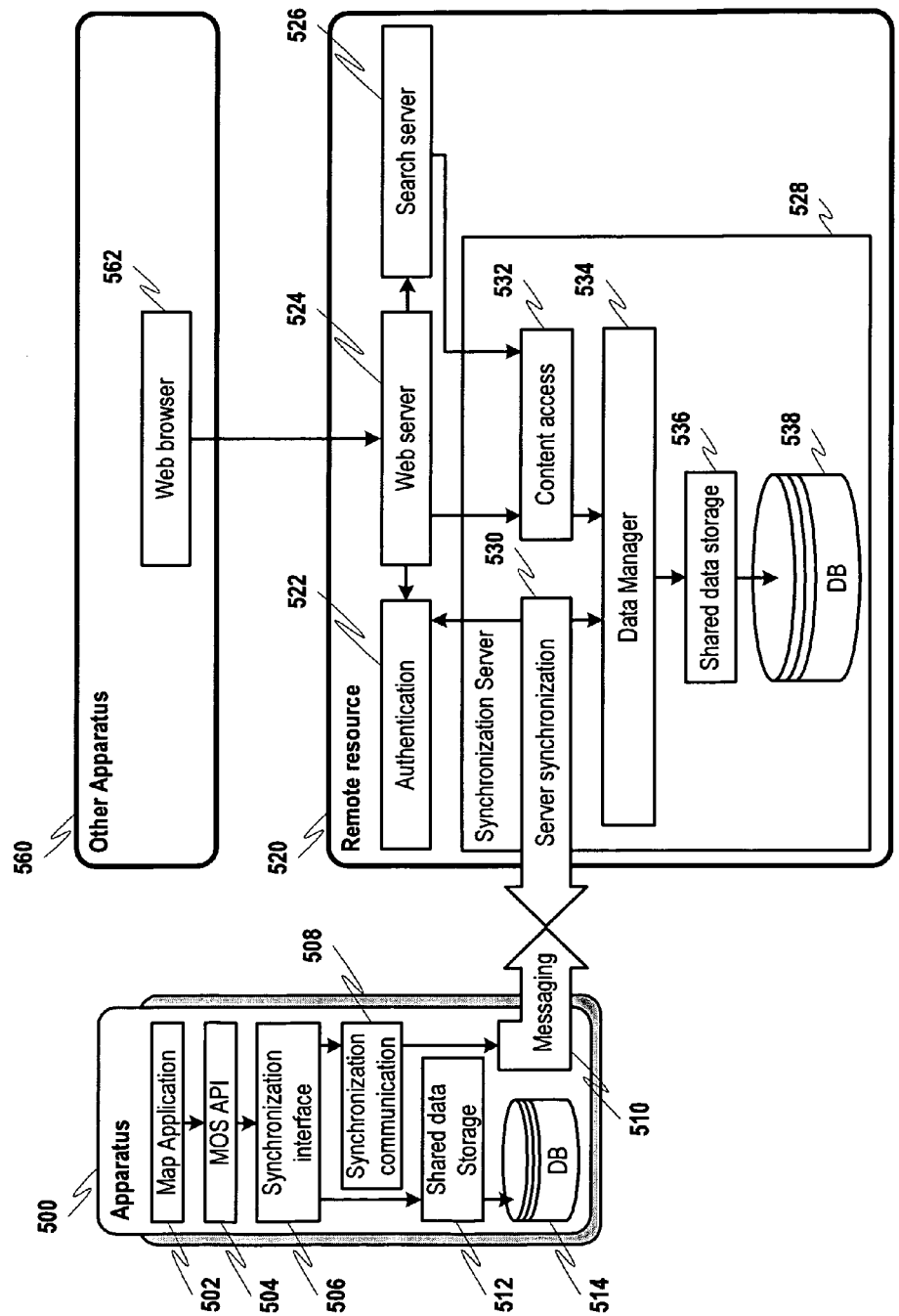
FIG. 8A discloses functional diagrams of the exemplary apparatuses and remote resource of FIG. 4A in accordance with at least one embodiment of the present invention.

In accordance with at least one embodiment of the present invention, FIG. 8A now discloses examples of functional configurations that may be utilized in apparatus 500, remote resource 520 and other apparatus 560. Apparatus 500 may include elements 502-518 implemented in software and/or hardware form. Map application (MA) 502 is an example of an user-configurable software interface for obtaining location and/or map information from, or for providing similar information to, remote resource 420 (e.g., www.ovi.com). For example, users may request information (e.g., directions, estimated time, traffic conditions, etc.) pertaining to a desired travel route by configuring a request using MA 502. An exemplary request configuration may include a user setting parameters in a software interface in order to obtain a desired output. MA 502 may then access map operating services application programming interface (MOS API) 504 to compute maps, location, direction or other related informational tasks. While various embodiments of the present invention are discussed herein in terms of exemplary map and/or location applications, this particular usage has been selected for the sake of explanation only, and is not intended to be limiting the disclosed embodiments to only being applied in this manner.

After a request has been configured by a user, MA 502 may utilize resources in apparatus 500 to access internal information, and/or may request information from an external source, in order to formulate a response to the request. The output information formulated in response to user configuration of MA 502 may, in some instances, be beneficial or desirable to other users of remote resource 520. In accordance with at least one embodiment of the present invention, information may be shared using synchronization elements 506-514 in apparatus 500.

Synchronization interface 506 may provide access to applications residing on apparatus 500 (e.g., MOS API 504) for sending information to, or receiving information from, the exemplary synchronization architecture disclosed in FIG. 8A. As part of this functionality, synchronization interface 406 may interact with synchronization elements supporting specific operations like information storage and communication. For example, shared data storage 512 and database 514 may incorporate software and/or hardware components usable for the storage of information used in a data sharing process in accordance with various embodiments of the present invention. Database (DB) 514 may contain, for example, search index data and/or actual stored information that is being made available to ("shared with") other users of remote resource 520. Synchronization communication 508 may further provide access, via messaging 510, for the transmission and reception of synchronization requests, commands and other information related to the synchronization system, such as information regarding data that is being shared.

Remote resource 520 may include exemplary elements 528-538 configured to support synchronization messaging, web browser access over an Internet connection, and sharing information amongst the users of remote resource 520 via wired and/or wireless communication. Initially connection to remote resource 520 may be controlled via authentication 522. This module may verify identification and/or security information for apparatuses, users, applications, etc. that attempt to connect to, or request information from, remote resource 520. Authentication 522 may, for example, verify the identity of entities connecting to synchronization server 528 via server synchronization 530, or from the other apparatus 560 connecting to web server 524 using, for example, web browser 562. Web server 524, aside from granting general access to remote resource 520, may allow web browser 562 to connect to search server 526. Web server 524 and search server 526 may, for example, utilize content access 532 to make search inquiries with data manager 534 in synchronization server 528 regarding shared information. For example, web browser 562 may directly access shared information via web server 524, while search server 526 may provide the ability to search for shared information in accordance with search parameters set in web browser 562.

Data manager 534 may also be accessed via server synchronization 530. This direct access may allow for synchronization of information in DB 414 and DB 538 (e.g., via shared data storage interface 536). Synchronization may ensure that data manager 534 has the most recent information regarding resources being shared by apparatuses enabled to access remote resource 520 (e.g., apparatus 500). Data stored in these apparatuses (e.g., apparatus 500) may also be accessed by querying global identifier information maintained in remote resource 520 (e.g., in DB 538 and/or data manager 534). For example, search server 526 may query data manager 534 (e.g., via content access 532) in order to determine what information is available on remote resource 520, as well as on apparatuses enabled to access remote resource 520 (e.g., apparatus 500). When desired information is located, remote resource 520 may respond with the desired information, global identifier information, etc. to the searching entity (e.g., other apparatus 560). The global identifier information may allow the inquiring apparatus to access the desired information at the source, request the transmission of the information, etc.

FIG. 8B discloses a timeline laying out exemplary transactions between devices that may share information in accordance with at least one embodiment of the present invention. This examples include apparatus 500 (e.g., a device including some or all of the functionality of WCD 100), remote resource 540 and other apparatus 560. Initially, in FIG. 8B a web-integrated service is activated in apparatus 500 at 800. While a web-integrated service is used in FIG. 8B, the embodiments of the present invention do not require use of this particular type of application.

After the application is activated, activity in apparatus 500 may result in the formulation of a data request at 802 to remote resource 540. For example, a user may configure the application to formulate composite data based on a plurality of POIs 610, and in order to fulfill this request, some or all of POI information may be requested from remote resource 540. At 804, apparatus 500 may send a data request to remote resource 540. The data request may trigger the accessing of databases in remote resource 540, computation, etc. in order to produce the resulting composite information, which may be then sent back to apparatus 500 for eventual presentation to the user. The information sent by remote resource 540 may also include global identifier information (e.g., Global_ID).

A user may then decide to share some or all of the information resulting from the requested execution of the web-integrated service application. When being used internally to an apparatus, information need only be identified by a local identifier. A local identifier (e.g., Local_ID) is an identifier known only to apparatus 500, and therefore, is not recognized by other apparatuses. However, as set forth above, remote resource may provide global identifier information with the information returned to apparatus 500. Apparatus 500 may then modify identification information corresponding to the information to be shared based on the global identifier information. Identification information for the shared information may be modified, for example, by replacing the Local_ID with a Global_ID, appending Global identification information to Local_ID, cross-referencing the local ID to a Global_ID in apparatus 500, etc.

Other apparatus 560 (e.g., another device including computing capabilities such as a laptop computer coupled to the Internet via wired or wireless communication) may desire to access previously created information at 808. Shared information may be attractive to a user due to, for example, the desire to obtain previously unknown information, speed, time and processing savings in avoiding reformulation of the same information, descriptive material corresponding to the material, etc. In terms of the previous exemplary scenario, a user review of a mapped route may reside in remote resource 540 along with related global identifier information. This review may state, for example, that shared information pertains to a route for a trip that was extremely enjoyable. As a result, other users may want to access this information from apparatus 400.

Access to the previously created information may be requested in the transaction of 810. For example, other apparatus 560 may transmit a wireless message requesting access to apparatus 400. This request may include, for example, identification information confirming that other apparatus 560 (user, application, etc.) is allowed to access shared information. Apparatus 500 may then respond by granting access to other apparatus 560, sending the shared information (e.g., via wireless communication), etc. The above transaction may assume that other apparatus 560 knows the identification (e.g., the Global_ID and location) of the desired information.

Figure 8C:
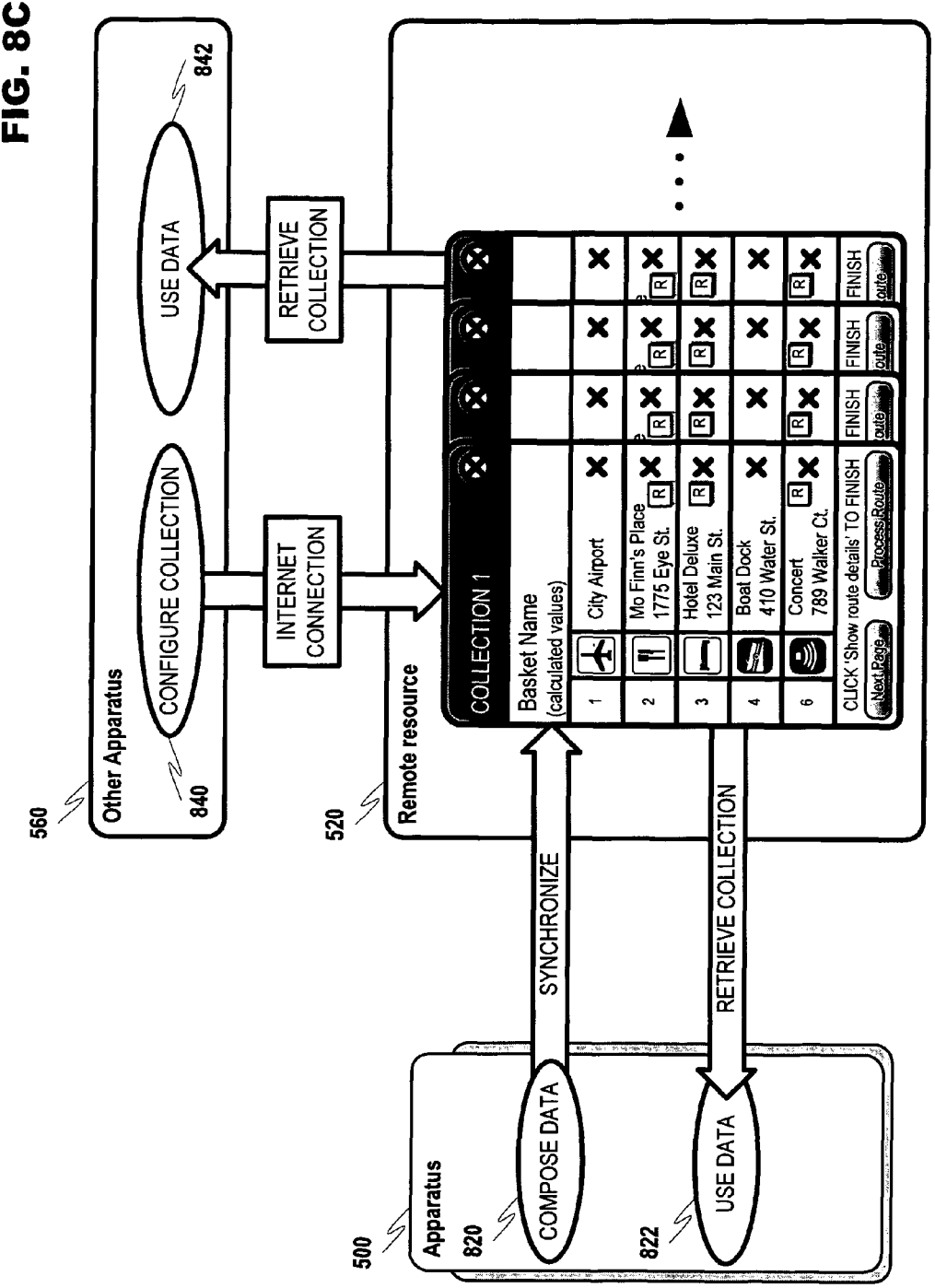
FIG. 8C discloses examples of information exchanged in accordance with at least one embodiment of the present invention.

In accordance with the previously described exemplary sharing architecture, FIG. 8C discloses a scenario where information may be shared in terms of the example initially set forth in FIG. 4. Apparatus 500 and other apparatus 560 may compose data (or configure collection information) at 820 and 840, respectively, that may later be shared. This data may include, for example, POIs 610 saved during a routing session (e.g., saved in the form of a data collection), or the resulting composite data. Further, both devices may search for and access previously compiled data at 822 and 842. While apparatus 500 may automatically obtain and deliver shared information via a synchronization process such as previously described, other apparatus 560 may access and request this information via, for example, a web browser linked to remote resource 520 via an Internet connection.

VII. Example Display in a Web Browser

Figure 9A:
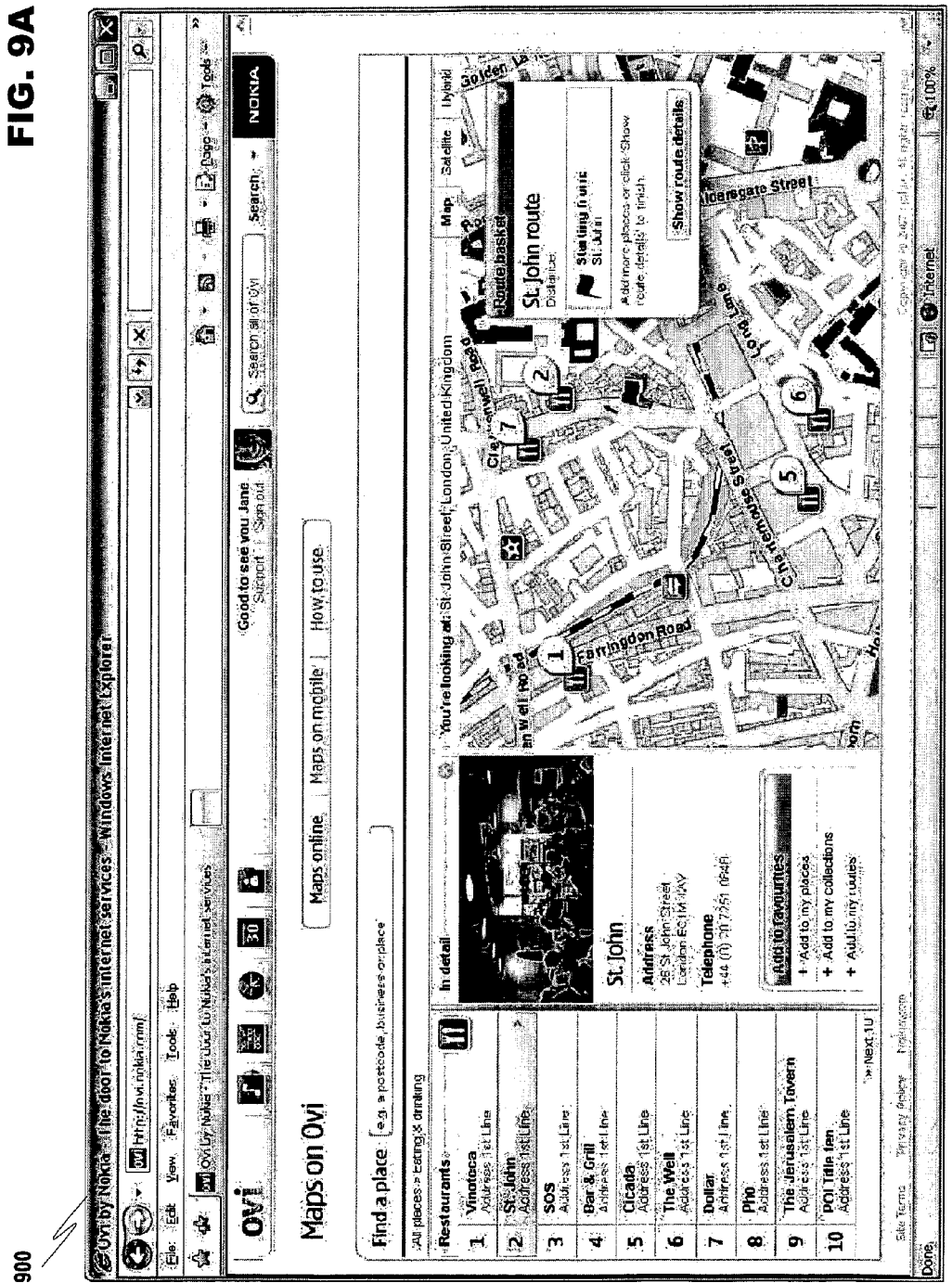
FIG. 9A discloses an exemplary web interface in a first state in accordance with at least one embodiment of the present invention.

FIG. 9A discloses a webpage example at 900. A source collection pertaining to "Bars & Pubs" is being viewed for possible addition to a Route Basket. One POI, "St. John," has already been added to the route basket. In addition, a user is viewing additional descriptive information related to "St. John" by selecting the POI in the "Bars & Pubs" source collection.

Figure 9B:
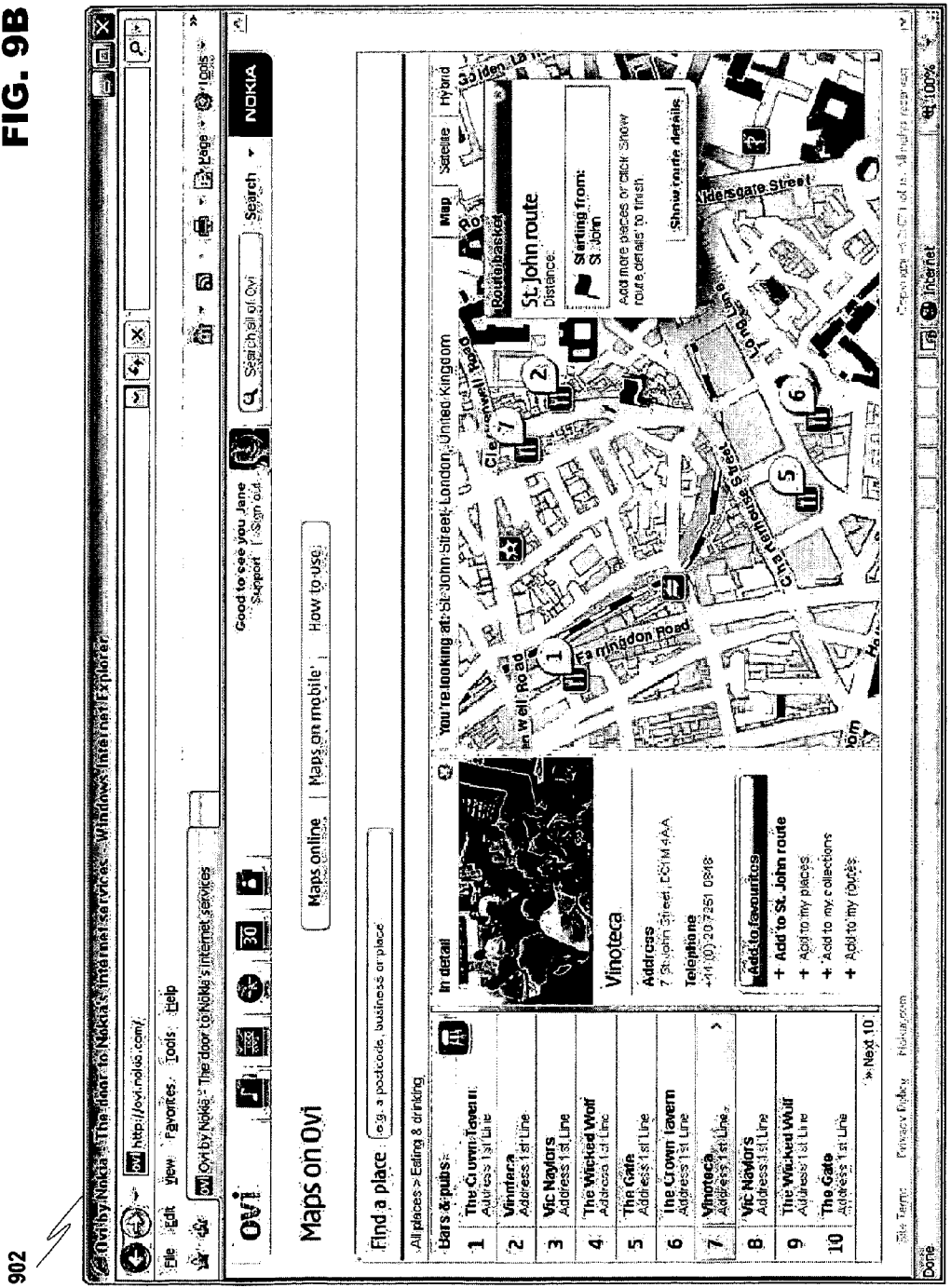
FIG. 9B discloses an exemplary web interface in a second state in accordance with at least one embodiment of the present invention.

FIG. 9B includes a later state of the webpage example now at 902. Here the user is now viewing another POI, "Vinoteca." In various embodiments of the present invention, a user may obtain information related to "Vinoteca" simply by placing the cursor over the POI, or alternatively, selecting the POI. Exemplary descriptive information shown may include name, address information and other data handling options related to mapping (e.g., determining coordinates for a POI).

Figure 9C:
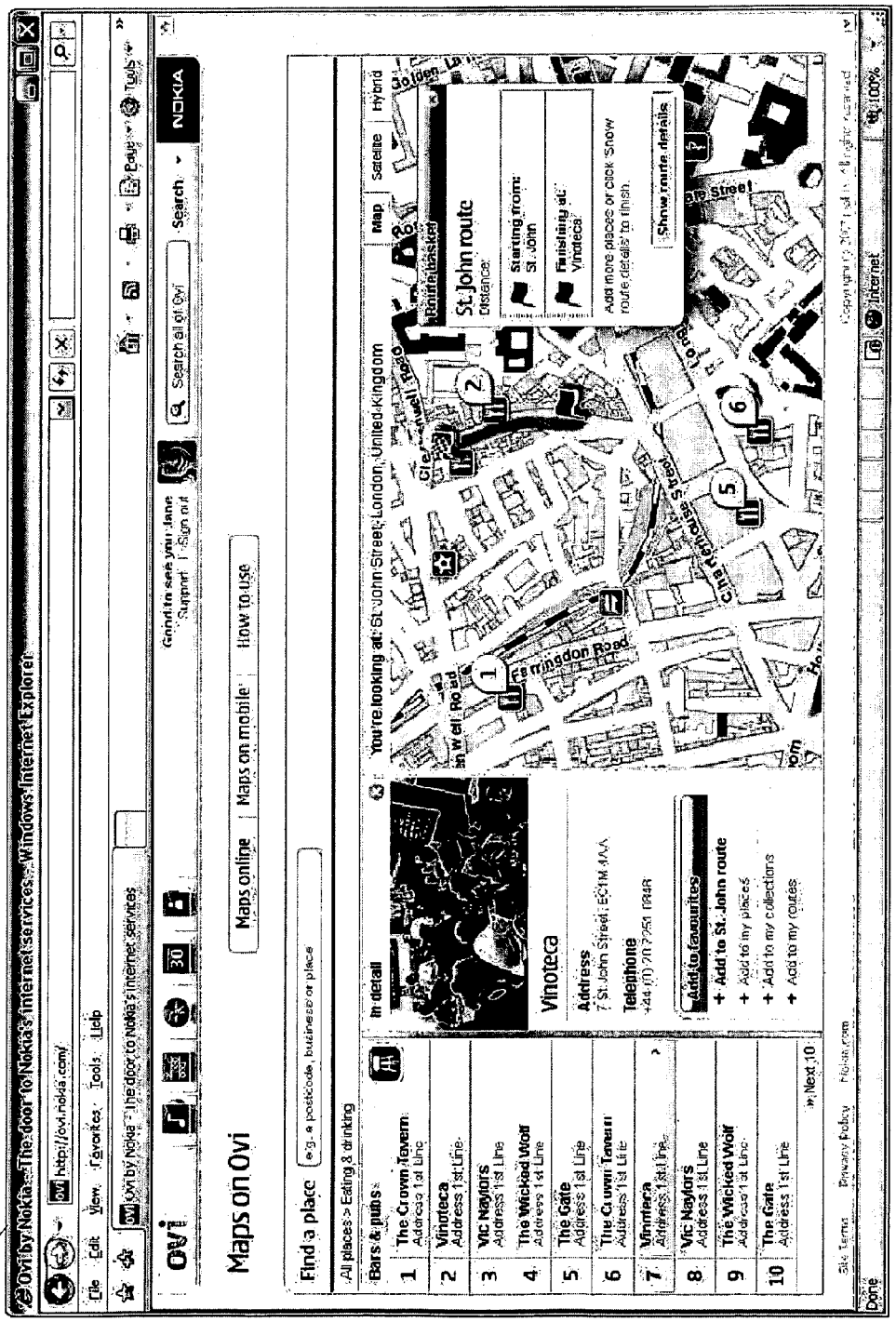
FIG. 9C discloses an exemplary web interface in a third state in accordance with at least one embodiment of the present invention.

In FIG. 9C at 904, the "Vinoteca" POI has now been added to the route basket. If this completes the list of POIs for the particular "St. John Route" collection, then the user may press the "show route details" button. This action may, in accordance with various embodiments of the present invention, cause the Application to process the data items in the route basket. In at least one embodiment of the present invention, routes may be shown on the map by illustrating a path of travel between POIs 610 in the route basket. Further, arrows in the route of display 904 may indicate a destination and/or direction of the movement of the user towards a POI 610.

Figure 10:
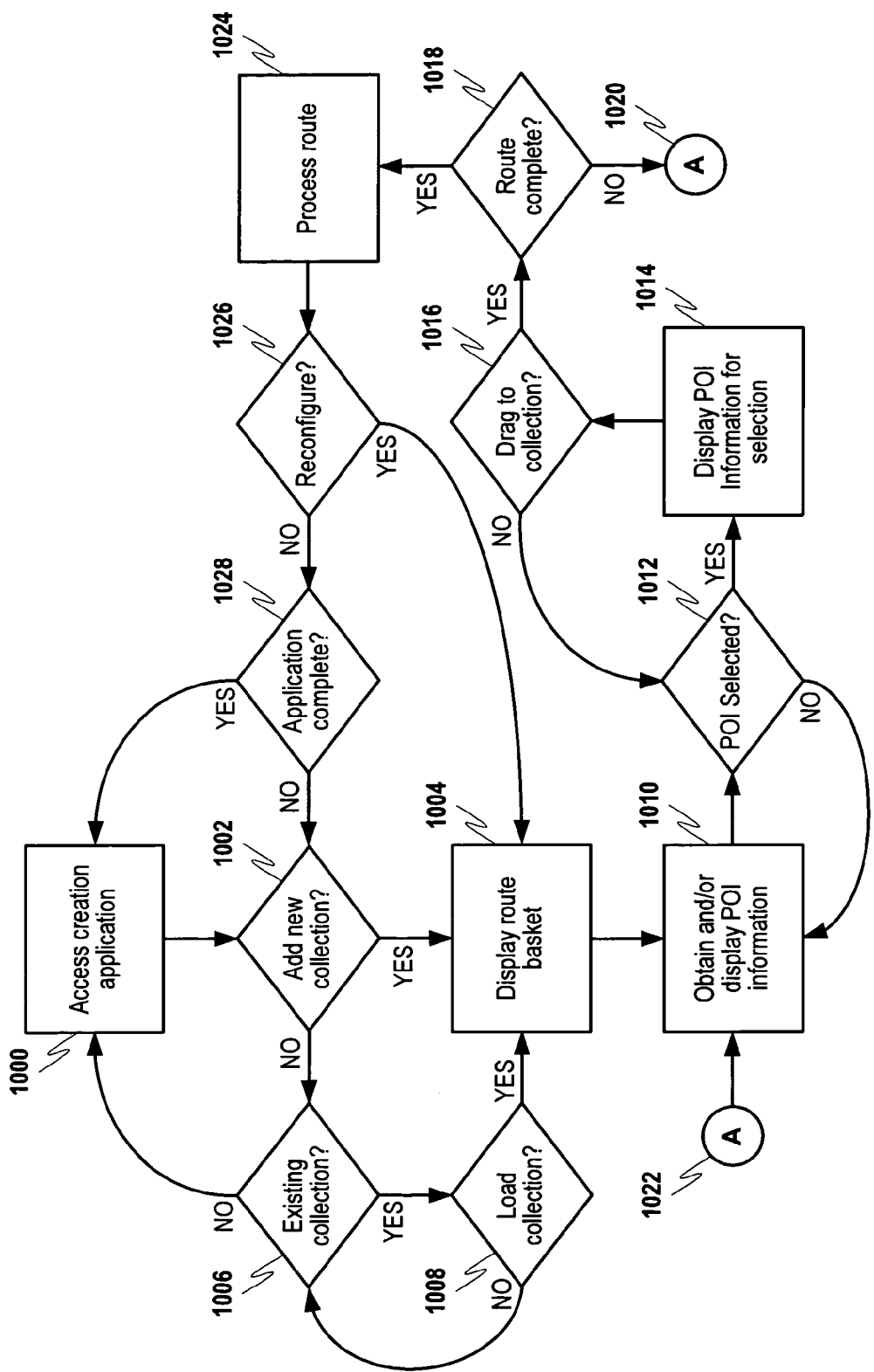
FIG. 10 discloses a flowchart for an exemplary process in accordance with at least one embodiment of the present invention.

A flow chart in accordance with at least one embodiment of the present invention is now disclosed with respect to FIG. 10. In step 1000 an application may be accessed. The exemplary application, used only for the sake of explanation herein, may be an application for "map and/or route creation." For example, a route basket may serve as a receptacle into which POIs are placed (e.g., via drag and drop interaction) in order to formulate a route between all of the "dragged" POIs. Outputs from the application may include, for example, the formulation of various maps and/or routes consolidating some or all of the dragged POI data. Further, the POI information added to the route basket may be saved as a collection of data accessible by the user (e.g., for revising), or possibly for other users if a determination is made to share the collection.

In step 1002 a determination may then be made as to whether to start a new data collection. If a new data collection is desired (e.g., in the case of starting a new travel plan) then the process may move to step 1004 where a new route basket is created. However, if the user does not want to create a new collection in step 1002, then in step 1004 a determination may be made as to whether there are any existing collections. If there are no existing collections then the process may not continue, and it may reset by returning to step 1000. However, if at least one existing collection exists then in step 1008 a collection may be loaded and the process may move to step 1010. If more than one collection exists, the process may loop in step 1008 until the desired collection is loaded, or no collection is loaded, which returns the process to step 1000 to restart.

Given either a new collection or an existing collection, in step 1010 POI information may be obtained or loaded. Obtaining POI information may include, for example, a user inputting a query which generates a source collection in accordance with the parameters configured by the user. In another instance, a user's previous source collections may still exist, and these may be loaded, for example, when the existing collection is loaded. In step 1012 a user may select a POI. If no POI is selected, then a case may exist where additional searching must be done to obtain the desired POI, and therefore the process returns to step 1010. If a POI is selected, then in step 1014 descriptive information for the selected POI may be displayed.

A user must then decide in step 1016 whether to drag the selected POI into the collection. If the user does not desire to include the selected POI, then the process may return to step 1012 for another selection. However, if the user desires to include the POI then it may be added. In step 1018 an inquiry is then made as to whether all of the desired POIs have been added. If not all the POIs have been added, then on-chart reference 1020 may return to on-chart reference 1022 to obtain and/or display new POI information. However, if the route is complete then the user may trigger formulation of the composite result (e.g., via clicking on a button to proceed), and the results may be displayed, stored, transmitted, shared, etc. in step 1024.

It is foreseeable that, in some instances, users may not be satisfied with the result outputted by the application, or that a process parameter may have changed (e.g., a mode of transportation, a POI, a time, etc.), and therefore, that the application should be reconfigured and rerun. In step 1026 a determination may be made as to whether reconfiguration is necessary. If a decision to reconfigure is approved, then in step 1004 the route basket for the active collection may be redisplayed, and the process may continue on from this point as previously described. If no change is deemed to be required in step 1026, and no further formulation is required from the application, then in step 1028 the process may end and return to step 1000. Alternatively, the process may return to step 1002 in order to edit a new collection, or load an existing collection.

In at least one exemplary embodiment of the present invention, the selection order of "dragged" POIs 610 may be retained and preserved in route basket 700 so that the data items appear in the order as selected by the user. In conjunction with the above, or in accordance with another exemplary embodiment of the present invention, when the map application is executing on an apparatus including a touch screen, touching a POI 610 may automatically copy it into route basket 700, if, for example, an "add to route basket" mode is activated in the apparatus.

Accordingly, it will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   determining to display a basket component in a map application of a communication device, the basket component including at least a visual representation of a container configured to accept interest information;
   formulating the interest information including a plurality of points of interest based on, at least in part, a point of interest category, each of the plurality of points of interest including at least descriptive information;
   determining to display the interest information in a source collection and determining to display other interest information in one or more other source collections;
   selecting at least one point of interest from formulated interest information to be moved into the basket component by a drag-and-drop interface activity;
   formulating composite information based on selected points of interest in the basket component;
   determining to display the composite information on a map; and
   communicating between the communication device and a remote application platform to facilitate a synchronization function, wherein the synchronization function comprises one or more of storage and communication of the interest information to facilitate information sharing amongst subscribers to the map application, and communication of one or more of synchronization requests, commands and synchronization-related information.

2. The method of claim 1, wherein the map application is at least one of an executable program on the communication device and a browser application for accessing Internet web pages.

3. The method of claim 1, wherein each of the one or more other source collections indicates a plurality of points of interest based on, at least in part, a respective point of interest category, formulating the interest information further comprises executing a query based on the point of interest category, and the other interest information is formulated by at least one other query based on at least one respective point of interest category.

4. The method of claim 1, wherein determining to display the interest information includes displaying at least one of the plurality of points of the interest information with a respective address in the source collection and displaying an indication of an availability of user review information in the source collection for at least one of the points of interest.

5. The method of claim 1, wherein selecting at least one point of interest triggers display of the descriptive information related to the at least one selected point of interest.

6. The method of claim 1, wherein selecting the at least one selected point of interest includes selecting a visual representation of the at least one point of interest using a computer pointing device and moving the at least one point of interest into the visual representation of the container.

7. The method of claim 1, wherein formulating composite information includes combining the composite information based on the selected points of interest in the basket component into an integrated visual representation.

8. The method of claim 1, further comprising:
   saving the composite information based on the selected points of interest in the basket component on a remote resource for storage for later use.

9. A non-transitory computer-readable storage medium carrying one or more sequences of one or more instructions which, when executed by one or more processors, cause an apparatus to at least perform the following steps:
   to display a basket component in a map application of the apparatus, the basket component including at least a visual representation of a container configured to accept interest information;
   formulating the interest information including a plurality of points of interest based on, at least in part, a point of interest category, each of the plurality of points of interest including at least descriptive information;
   determining to display the interest information in a source collection and determining to display other interest information in one or more other source collections;
   selecting at least one point of interest from formulated interest information to be moved into the basket component by a drag-and-drop interface activity;
   formulating composite information based on selected points of interest in the basket component;
   determining to display the composite information on a map; and
   communicating between the apparatus and a remote application platform to facilitate a synchronization function, wherein the synchronization function comprises one or more of storage and communication of the interest information to facilitate information sharing amongst subscribers to the map application, and communication of one or more of synchronization requests, commands and synchronization-related information.

10. The non-transitory computer-readable storage medium of claim 9, wherein the map application is at least one of an executable program on the apparatus and a browser application for accessing Internet web pages.

11. The non-transitory computer-readable storage medium of claim 9, wherein formulating interest information includes executing a query based on parameters configured in an application interface by a user.

12. The non-transitory computer-readable storage medium of claim 9, wherein determining to display the interest information includes displaying each of the points of interest including some of the descriptive information.

13. The non-transitory computer-readable storage medium of claim 9, wherein selecting at least one point of interest triggers a display of descriptive information related to at least one selected point of interest.

14. The non-transitory computer-readable storage medium of claim 9, wherein selecting the at least one selected point of interest includes selecting a visual representation of the one selected point of interest using a computer pointing device and moving the one selected point of interest into the visual representation of the container.

15. The non-transitory computer-readable storage medium of claim 9, wherein formulating composite information includes combining the composite information based on the selected points of interest in the basket component into an integrated visual representation.

16. The non-transitory computer-readable storage medium of claim 9, wherein the apparatus is caused to further perform:
   saving the composite information based on the selected points of interest in the basket component on a remote resource for storage for later use.

17. An apparatus, comprising:
   at least one processor; and
   at least one memory including computer program code for one or more programs,
   the at least one memory and the computer program code configured to, with the at least one processor, cause the apparatus to perform at least the following,
   display a basket component in a map application of the apparatus, the basket component including at least a visual representation of a container configured to accept interest information;
formulate the interest information including a plurality of points of interest based on, at least in part, a point of interest category, each of the plurality of points of interest including at least descriptive information;
display the interest information in a source collection and display other interest information in one or more other source collections;
select at least one point of interest from formulated interest information to be moved into the basket component by a drag-and-drop interface activity;
formulate composite information based on selected points of interest in the basket component;
display the composite information on a map; and
communicate between the apparatus and a remote application platform to facilitate a synchronization function, wherein the synchronization function comprises one or more of storage and communication of the interest information to facilitate information sharing amongst subscribers to the map application, and communication of one or more of synchronization requests, commands and synchronization-related information.

18. The apparatus of claim 17, wherein the map application is at least one of an executable program on the apparatus and a browser application for accessing Internet web pages.

19. The apparatus of claim 17, wherein formulating the interest information includes executing a query based on parameters configured in an application interface by a user.

20. The apparatus of claim 17, wherein determining to display the interest information includes displaying each of the points of interest including some of the descriptive information.

21. The apparatus of claim 17, wherein selecting at least one point of interest triggers display of the descriptive information related to at least one selected point of interest.

22. The apparatus of claim 17, wherein selecting at least one selected point of interest includes selecting a visual representation of the point of interest using a computer pointing device and moving the at least one selected point of interest into a visual representation of the basket component.

23. The apparatus of claim 17, wherein formulating composite information includes combining the composite information based on the selected points of interest in the basket component into an integrated visual representation.

24. The apparatus of claim 17, wherein the apparatus is further caused to:
save the selected points of interest in the basket component on a remote resource for storage for later use.

25. An apparatus, comprising:
means for determining to display a basket component in a map application of the apparatus, the basket component including at least a visual representation of a container configured to accept interest information;
means for formulating the interest information including a plurality of points of interest based on, at least in part, a point of interest category, each of the plurality of points of interest including at least descriptive information;
means for determining to display the interest information in a source collection and means for determining to display other interest information in one or more other source collections;
means for selecting at least one point of interest from formulated interest information to be moved into the basket component by a drag-and-drop interface activity;
means for formulating composite information based on selected points of interest in the basket component;
means for determining to display the composite information on a map;
means for communicating between the apparatus and a remote application platform to facilitate a synchronization function, wherein the synchronization function comprises one or more of storage and communication of the interest information to facilitate information sharing amongst subscribers to the map application, and communication of one or more of synchronization requests, commands and synchronization-related information.

26. A system comprising:
at least one apparatus;
the at least one apparatus determining to display a basket component in a map application, the basket component including at least a visual representation of a container configured to accept interest information;
the at least one apparatus formulating the interest information, based on a user configuration and based on, at least in part, a point of interest category, including a plurality of points of interest to the user, each of the plurality of points of interest including at least descriptive information;
the at least one apparatus determining to display the interest information in a source collection to the user and determining to display other interest information in one or more other source collections to the user, the user further selecting at least one point of interest from formulated interest information;
the user further selecting the at least one selected point of interest to be moved into the basket component by a drag-and-drop interface activity;
triggering the at least one apparatus to formulate composite information based on selected points of interest in the basket component;
the at least one apparatus determining to display the composite information to the user on a map; and
the at least one apparatus communicating with a remote application platform to facilitate a synchronization function, wherein the synchronization function comprises one or more of storage and communication of the interest information to facilitate information sharing amongst subscribers to the map application, and communication of one or more of synchronization requests, commands and synchronization-related information.

27. An apparatus, comprising:
a display;
an interface architecture including a basket component integrated within a user interface for a map application of the apparatus configured to display user-selected data items including a plurality of points of interest in a source collection for the point of interest category and display user-selected data items in one or more other source collections, the basket component being configured to receive the user-selected data items via a drag-and-drop interface activity; and
a communication module configured to communicate between the apparatus and a remote application platform to facilitate a synchronization function, wherein the synchronization function comprises one or more of storage and communication of the user-selected data items to facilitate information sharing amongst subscribers to the map application, and communication of one or more of synchronization requests, commands and synchronization-related information.

28. The interface architecture of claim 27, wherein each of the user-selected data items represents a point-of-interest to be used in formulating the map by the map application, each of the user-selected data items including at least information describing a corresponding point-of-interest.

29. The interface architecture of claim 28, wherein each of the user-selected data items is represented by a point-of-interest included in the map formulated by the map application.

30. The interface architecture of claim 29, wherein point-of-interest representations are used to form a travel route connecting two or more adjacent representations on the map formulated by the map application.

31. A chipset, comprising:
a processor; and
at least one memory configured with computer-readable program code that, when executed by the processor:
activates a map application configured to display user-selected data items including a plurality of points of interest in a source collection for the point of interest category and to display user-selected data items in one or more other source collections;
determines to display a user interface for the map application, the user interface including at least a basket component configured to receive one or more user-selected data items via a drag-and-drop interface activity; and
facilitates communication for communicating with a remote application platform to facilitate a synchronization function, wherein the synchronization function comprises one or more of storage and communication of the user-selected data items to facilitate information sharing amongst subscribers to the map application, and communication of one or more of synchronization requests, commands and synchronization-related information.

32. A non-transitory computer-readable storage carrying one or more sequences of one or more instructions which, when executed by one or more processors, cause an apparatus to at least perform the following steps:
activating a map application configured to display user-selected data items including a plurality of points of interest in a source collection for the point of interest category and to display user-selected data items in one or more other source collections;
determining to display a user interface for the map application, the user interface including at least a basket component configured to receive one or more user-selected data items via a drag-and-drop interface activity; and
communicating with a remote application platform to facilitate a synchronization function, wherein the synchronization function comprises one or more of storage and communication of the user-selected data items to facilitate information sharing amongst subscribers to the map application, and communication of one or more of synchronization requests, commands and synchronization-related information.

33. The method of claim 1, wherein determining to display the composite information on the map includes displaying the composite information as a best route, in terms of distance and time, between the selected points of interest, on the map.

34. The non-transitory computer-readable storage medium of claim 9, wherein the determining to display the composite information on the map includes determining to display the composite information as a best route, in terms of distance and time, between the selected points of interest, on the map.

35. The apparatus of claim 17, wherein determining to display the composite information on the map includes determining to display the composite information as a best route, in terms of distance and time, between the selected points of interest, on the map.

36. The apparatus of claim 25, wherein the determining to display the composite information on the map includes determining to display the composite information as a best route, in terms of distance and time, between the selected points of interest, on the map.

37. The system of claim 26, wherein the determining to display the composite information to the user on the map includes determining to display the composite information as a best route, in terms of distance and time, between the selected points of interest, on the map.

38. The apparatus of claim 27, wherein the map application is further configured to formulate the user-selected data items into a best route, in terms of distance and time, between selected points of interest, on the map.

39. The chipset of claim 31, wherein the map application is further configured to formulate the user-selected data items into a best route, in terms of distance and time, between selected points of interest, on the map.

40. The non-transitory computer-readable storage medium of claim 32, wherein the map application is further configured to formulate the user-selected data items into a best route, in terms of distance and time, between selected points of interest, on the map.

* * * * *